(12) United States Patent
Xiao et al.

(10) Patent No.: US 8,826,368 B2
(45) Date of Patent: *Sep. 2, 2014

(54) PLATFORM AUTHENTICATION METHOD SUITABLE FOR TRUSTED NETWORK CONNECT ARCHITECTURE BASED ON TRI-ELEMENT PEER AUTHENTICATION

(75) Inventors: Yuelei Xiao, Shaanxi (CN); Jun Cao, Shaanxi (CN); Li Ge, Shaanxi (CN); Zhenhai Huang, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 247 days.

This patent is subject to a terminal disclaimer.

(21) Appl. No.: 13/266,856

(22) PCT Filed: Dec. 24, 2009

(86) PCT No.: PCT/CN2009/075942
§ 371 (c)(1),
(2), (4) Date: Oct. 28, 2011

(87) PCT Pub. No.: WO2010/124504

PCT Pub. Date: Nov. 4, 2010

(65) Prior Publication Data
US 2012/0047555 A1    Feb. 23, 2012

(30) Foreign Application Priority Data
Apr. 28, 2009    (CN) .......................... 2009 1 0022232

(51) Int. Cl.
| | | |
|---|---|---|
| *G06F 17/00* | (2006.01) | |
| *H04L 17/30* | (2006.01) | |
| *G06F 21/44* | (2013.01) | |
| *G06F 21/57* | (2013.01) | |
| *H04L 9/32* | (2006.01) | |
| *H04L 29/06* | (2006.01) | |

(52) U.S. Cl.
CPC ........... *H04L 63/0823* (2013.01); *H04L 63/105* (2013.01); *H04L 63/0876* (2013.01); *G06F 21/445* (2013.01); *H04L 9/321* (2013.01); *H04L 63/20* (2013.01); *G06F 2221/2115* (2013.01); *G06F 2221/2103* (2013.01); *H04L 9/3263* (2013.01); *H04L 9/3271* (2013.01); *G06F 21/57* (2013.01); *H04L 9/3247* (2013.01)
USPC ............................... 726/1; 713/167; 713/176

(58) Field of Classification Search
USPC .......... 713/168–174, 182–186, 202; 709/225, 709/229; 726/2–8
See application file for complete search history.

(56) References Cited

U.S. PATENT DOCUMENTS

| | | |
|---|---|---|
| 6,199,113 B1 | 3/2001 | Alegre et al. |
| 7,592,906 B1 | 9/2009 | Hanna et al. |

(Continued)

FOREIGN PATENT DOCUMENTS

| | | |
|---|---|---|
| CN | 1976337 A | 6/2007 |
| CN | 1976338 A | 6/2007 |

(Continued)

OTHER PUBLICATIONS

TCG Trusted Network Connect TNC Architecture for Interoperability, Version 1.1, revision 2, May 2006, p. 1-40.*

(Continued)

*Primary Examiner* — Evans Desrosiers
(74) *Attorney, Agent, or Firm* — Harness, Dickey & Pierce, P.L.C.

(57) ABSTRACT

The invention discloses a platform authentication method suitable for trusted network connect (TNC) architecture based on tri-element peer authentication (TePA). The method relates to a platform authentication protocol of tri-element peer authentication, and the protocol improves network security as compared with prior platform authentication protocols; in the platform authentication protocol of the TNC architecture based on TePA, a policy manager plays a role as a trusted third party, which is convenient for concentrated management, thus enhancing manageability; the invention relates to the platform authentication protocol of the TNC architecture based on TePA, has different implementation methods and is beneficial for different dispositions and realizations.

9 Claims, 2 Drawing Sheets

(56) References Cited

U.S. PATENT DOCUMENTS

| | | | |
|---|---|---|---|
| 7,793,096 | B2 | 9/2010 | Hurst et al. |
| 7,793,103 | B2 | 9/2010 | Fu et al. |
| 7,827,545 | B2 | 11/2010 | Choe et al. |
| 7,827,593 | B2 | 11/2010 | Smith et al. |
| 7,849,495 | B1 | 12/2010 | Huang et al. |
| 7,982,595 | B2 | 7/2011 | Hanna et al. |
| 8,191,113 | B2 | 5/2012 | Xiao et al. |
| 8,255,977 | B2 | 8/2012 | Xiao et al. |
| 8,336,083 | B2 | 12/2012 | Xiao et al. |
| 8,424,060 | B2 | 4/2013 | Xiao et al. |
| 8,495,712 | B2 | 7/2013 | Lai et al. |
| 2002/0095586 | A1 | 7/2002 | Doyle et al. |
| 2003/0200431 | A1 | 10/2003 | Stirbu |
| 2005/0216736 | A1 | 9/2005 | Smith |
| 2005/0223007 | A1 | 10/2005 | Zimmer et al. |
| 2006/0015718 | A1 | 1/2006 | Liu et al. |
| 2006/0248337 | A1 | 11/2006 | Koodli |
| 2007/0136577 | A1 | 6/2007 | Bade et al. |
| 2007/0143629 | A1 | 6/2007 | Hardjono et al. |
| 2007/0198837 | A1 | 8/2007 | Koodli et al. |
| 2007/0300069 | A1 | 12/2007 | Rozas |
| 2008/0072329 | A1 | 3/2008 | Herschaft |
| 2008/0182592 | A1 | 7/2008 | Cha et al. |
| 2008/0276301 | A1 | 11/2008 | Nataraj et al. |
| 2008/0288777 | A1 | 11/2008 | Lai et al. |
| 2009/0077631 | A1 | 3/2009 | Keohane et al. |
| 2010/0031031 | A1 | 2/2010 | Tian et al. |
| 2010/0037302 | A1 | 2/2010 | Lai et al. |
| 2010/0251334 | A1 | 9/2010 | Xiao et al. |
| 2011/0145425 | A1 | 6/2011 | Xiao et al. |
| 2011/0202992 | A1 | 8/2011 | Xiao et al. |
| 2012/0036553 | A1 | 2/2012 | Xiao et al. |
| 2012/0185694 | A1* | 7/2012 | Munetoh et al. ............. 713/168 |

FOREIGN PATENT DOCUMENTS

| | | |
|---|---|---|
| CN | 101136928 A | 3/2008 |
| CN | 101159640 A | 4/2008 |
| CN | 101159660 A | 4/2008 |
| CN | 101159660 A | 4/2008 |
| CN | 101242266 A | 8/2008 |
| CN | 101242268 A | 8/2008 |
| CN | 101247223 A | 8/2008 |
| CN | 101345660 A | 1/2009 |
| CN | 101394283 A | 3/2009 |
| CN | 101527717 A | 9/2009 |
| CN | 101527718 A | 9/2009 |
| CN | 101540676 A | 9/2009 |
| CN | 100566252 C | 12/2009 |
| CN | 101540676 B | 5/2012 |
| EP | 1182557 A2 | 2/2002 |
| WO | 2006/117738 A1 | 11/2006 |

OTHER PUBLICATIONS

International Search Report for PCT/CN2009/075942, ISA/CN, Beijing, P.R. China, mailed Apr. 1, 2010.

TCG Trusted Network Connect. TNC Architecture for Interoperability. Specification Version 1.2. Revision 4. May 21, 2007.

Office Action regarding U.S. Appl. No. 13/264,683, mailed Apr. 8, 2013.

TCG Trusted Network Connect TNC Architecture for Interoperability. Specification Version 1.3, Revision 6, Apr. 28, 2008.

TCG Trusted Network Connect TNC IF-IMC. Specification Version 1.2, Revision 8. Feb. 5, 2007.

Wang Zhenyu et al. "Design and Implementation of Wireless Trusted Access Protocol for Embedded Trusted Endpoints." National Digital Switching System Engineering & Technology Research Center. Zhengzhou, Henan, China. IEEE 2008.

International Search Report for Application No. PCT/CN2009/075435, mailed Mar. 18, 2010.

TCG Trusted Network Connect. TNC Architecture for Interoperability. Specification Version 1.4, Revision 4. May 18, 2009.

Office Action regarding U.S. Appl. No. 13/628,903, mailed Dec. 12, 2011.

Trusted Network Connect—Open Standards for Integrity-based Network Access Control. 2005. Trusted Computing Group. p. 1-4.

International Search Report regarding Application No. PCT/CN2008/071699, mailed Nov. 6, 2008.

Ge Qin et al. "Research on Trusted Platform Module." Journal of Information Engineering University. vol. 7, No. 4. Dec. 2006.

TNC—Trusted Network Connection. Netinfo Security. China Academic Journal Electronic Publishing House. Mar. 2007. Abstract provided by Unitalen Attorneys at Law.

Office Action regarding U.S. Appl. No. 12/626,546, mailed Feb. 1, 2012.

TCG Trusted Network Connect TNC Architecture for Interoperability. Specification Version 1.1. Revision 2. May 1, 2006.

European Search Report regarding Application No. 08773227.7, dated Nov. 4, 2011.

Japanese Office Action regarding Application No. 2010-518480, mailed Aug. 21, 2012. Translation provided by Unitalen Attorneys at Law.

Sachiko Yoshihama. "Platform Trust Based Access Control Framework." The 2006 Symposium on Cryptography and Information Security. Hiroshima, Japan. Jan. 17-20, 2006. The Institute of Electronics, Information and Communication Engineers. Abstract provided by Unitalen Attorneys at Law.

Xiao-Yong Li and Chang-Xiang Shen. "An Efficient Attestation for Trustworthiness of Computing Platform." Proceedings of the 2006 International Conference on Intelligent Information Hiding and Multimedia Signal Processing. Dec. 2006.

"What is TCG's Trusted Network Connect?" Interop Labs. May 2007.

Shane Balfe et al. "Trusted Computing: Providing Security for Peer-to-Peer Networks." Information Security Group, Royal Holloway, University of London, United Kingdom. Proceedings of the Fifth IEEE International Conference on Peer-to-Peer Computing. Aug. 31-Sep. 2, 2005.

TCG Trusted Network Connect TNC IF-IMV, Specification Version 1.2, Revision 8, Feb. 5, 2007, pp. 1-91.

Carbone et al., "A formal model for trust in dynamic networks", Software Engineering and Formal Methods, 2003, Proceedings, First International Conference on Sep. 22-27, 2003, pp. 54-61. Printed from: http://citeseer.ist.psu.edu/viewdoc/download?doi=10.1.1.10.2207&rep=rep1&type=pdf.

* cited by examiner

PLATFORM AUTHENTICATION METHOD SUITABLE FOR TRUSTED NETWORK CONNECT ARCHITECTURE BASED ON TRI-ELEMENT PEER AUTHENTICATION

CROSS REFERENCE TO RELATED APPLICATIONS

This application is a U.S. National Phase application of PCT/CN2009/075942, filed Dec. 24, 2009, and published in the Chinese language as WO/2010/124504 A1 on Nov. 4, 2010. This application claims priority to Chinese patent application No. 200910022232.6, entitled "PLATFORM AUTHENTICATION METHOD SUITABLE FOR TRUSTED NETWORK CONNECT ARCHITECTURE BASED ON TRI-ELEMENT PEER AUTHENTICATION" and filed with the State Intellectual Property Office on Apr. 28, 2009, which is hereby incorporated by reference in its entirety.

FIELD OF THE INVENTION

The present invention relates to the field of network security technologies, and in particular to a platform authentication method suitable for a trusted network connect architecture based on tri-element peer authentication.

BACKGROUND OF THE INVENTION

With the development of informatization, problems of malicious software such as viruses and worms are growing. Currently, more than 35,000 forms of malicious software have been found, and more than 40,000,000 computers are infected each year. To prevent these attacks, it is required not only secured transmission and inspection of data while they are being inputted, but also protection starting from the source, i.e., every endpoint connected to the network. However, conventional security protection techniques can no longer protect against the various malicious attacks.

To this end, the Trusted Computing Group (TCG) have developed a network access specification based on Trusted Computing (TC), i.e., Trusted Network Connect (TNC), hereinafter referred to as TCG-TNC, which includes an open architecture for endpoint integrity and a set of standards that ensure secure interoperability. The set of standards can protect a network as needed by the user, to a user-defined level. Basically, the TCG-TNC is to establish a connection starting from endpoint integrity. Firstly, a set of policies for the operation of the systems within a trusted network are established. Only those endpoints that comply with the network-specified policies are allowed to access the network, and those devices that do not comply with the policies will be isolated and located by the network. Due to the use of a Trusted Platform Module (TPM), attacks from rootkits can also be blocked. A rootkit is an attack script, a modified system program, or a set of attack scripts or tools, for illegally obtaining the highest privileges in a targeted system. The architecture of TCG-TNC is shown in FIG. 1.

In FIG. 1, the Vendor-Specific IMC-IMV Messages Interface (IF-M) is an interface between an Integrity Measurement Collector (IMC) and an Integrity Measurement Verifier (IMV); the TNC Client-TNC Server Interface (IF-TNCCS) is an interface between a TNC client and a TNC server; the Network Authorization Transport Protocol Interface (IF-T) is an interface between a network access requestor and a network access authorizer; the Policy Enforcement Point Interface (IF-PEP) is an interface between a policy enforcement point and a network access authorizer; the Integrity Measurement Collector Interface (IF-IMC) is an interface between an integrity measurement collector and a TNC client; and the Integrity Measurement Verifier Interface (IF-IMV) is an interface between an integrity measurement verifier and a TNC server.

In the TCG-TNC architecture shown in FIG. 1, the access requestor does not evaluate the integrity of the policy enforcement point, hence, the policy enforcement point can not be relied upon. To solve this problem, a TNC architecture based on Tri-element Peer Authentication (TePA) has been proposed. The TePA-based TNC architecture is shown in FIG. 2.

In FIG. 2, the Integrity Measurement Interface (IF-IM) is an interface between an integrity measurement collector and an integrity measurement verifier; the TNC Client-TNC Access Point Interface (IF-TNCCAP) is an interface between a TNC client and a TNC access point; the Evaluation Policy Service Interface (IF-EPS) is an interface between a TNC access point and an evaluation policy server; the Trusted Network Transport Interface (IF-TNT) is an interface between a network access requestor and a network access controller; the Authentication Policy Service Interface (IF-APS) is an interface between a network access controller and an authentication policy server; the Integrity Measurement Collector Interface (IF-IMC) is between an integrity measurement collector and a TNC client, and between an integrity measurement collector and a TNC access point; and the Integrity Measurement Verifier Interface (IF-IMV) is an interface between an integrity measurement verifier and an evaluation policy server.

The TCG-TNC architecture shown in FIG. 1 and the TePA-based TNC architecture shown in FIG. 2 both require a platform authentication protocol to realize platform authentication (including platform credential authentication and integrity check handshake). However, due to the significant differences between the TePA-based TNC architecture shown in FIG. 2 and the TCG-TNC architecture shown in FIG. 1, the platform authentication protocol for the TCG-TNC architecture is not suitable for the TePA-based TNC architecture shown in FIG. 2. Therefore, it is desired to design a platform authentication protocol suitable for the TePA-based TNC architecture shown in FIG. 2.

SUMMARY OF THE INVENTION

To solve the technical problems discussed in the BACKGROUND OF THE INVENTION, the present invention provides a platform authentication method suitable for a trusted network connect architecture based on tri-element peer authentication, which can improve network safety, facilitate centralized management and be beneficial for different deployments and implementations.

According to the present invention, it is provided a platform authentication method suitable for a trusted network connect architecture based on tri-element peer authentication, in which a TNC client, a TNC access point and an evaluation policy server perform a tri-element peer authentication protocol, including:

interacting with messages, between the TNC access point and the TNC client, to request for an integrity measurement value of each other's platform, and verify a platform signature on the integrity measurement value of each other's platform; and interacting with messages, between the TNC access point and the evaluation policy server, so that the evaluation policy server verifies the validity of a platform identity certificate and evaluates the integrity measurement value.

The present invention may provide the following advantages.

1. Network safety can be improved. The platform authentication protocol for a TePA-based TNC architecture according to the present invention is a tri-element peer authentication protocol, which therefore can improve network safety in comparison with existing platform authentication protocols.

2. Centralized management can be facilitated. In the platform authentication protocol for a TePA-based TNC architecture according to the present invention, the policy manager acts as a trusted third party, which facilitates centralized management, and thus can improve manageability.

3. Different deployments and implementations can benefit. The platform authentication protocol for a TePA-based TNC architecture according to the present invention can be implemented in different ways, allowing different deployments and implementations. For example, the AIK certificate validity verification function may be implemented with a platform CA, and the evaluation of the integrity measurement value may be implemented with an evaluation server, both of which may be a trusted third party.

DETAILED DESCRIPTION OF THE INVENTION

Figure 1:
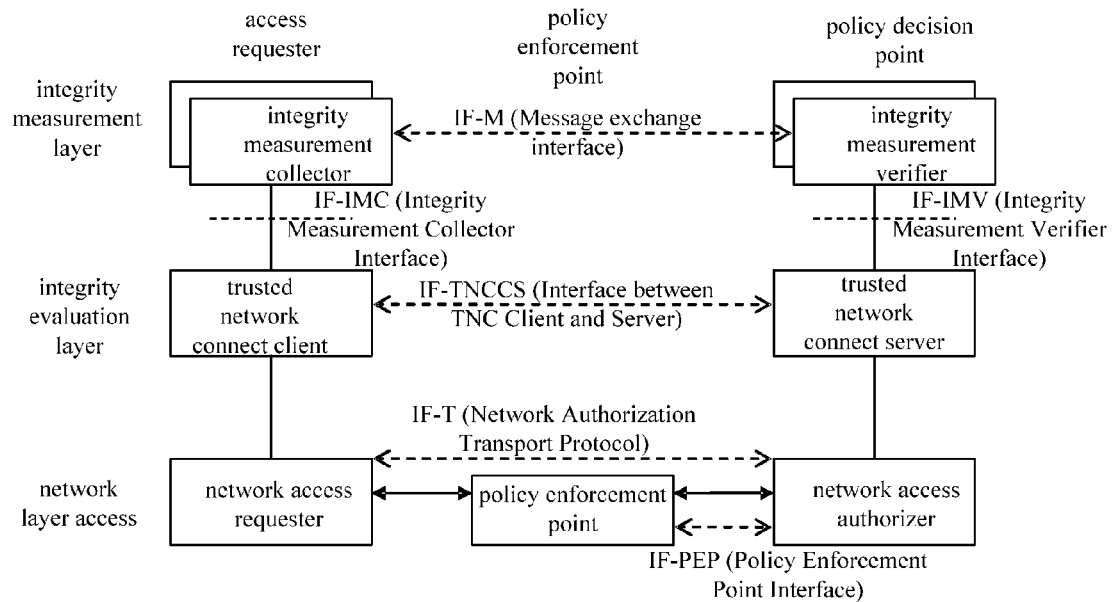
FIG. 1 is a structural diagram of an existing TCG-TNC architecture.
Figure 2:
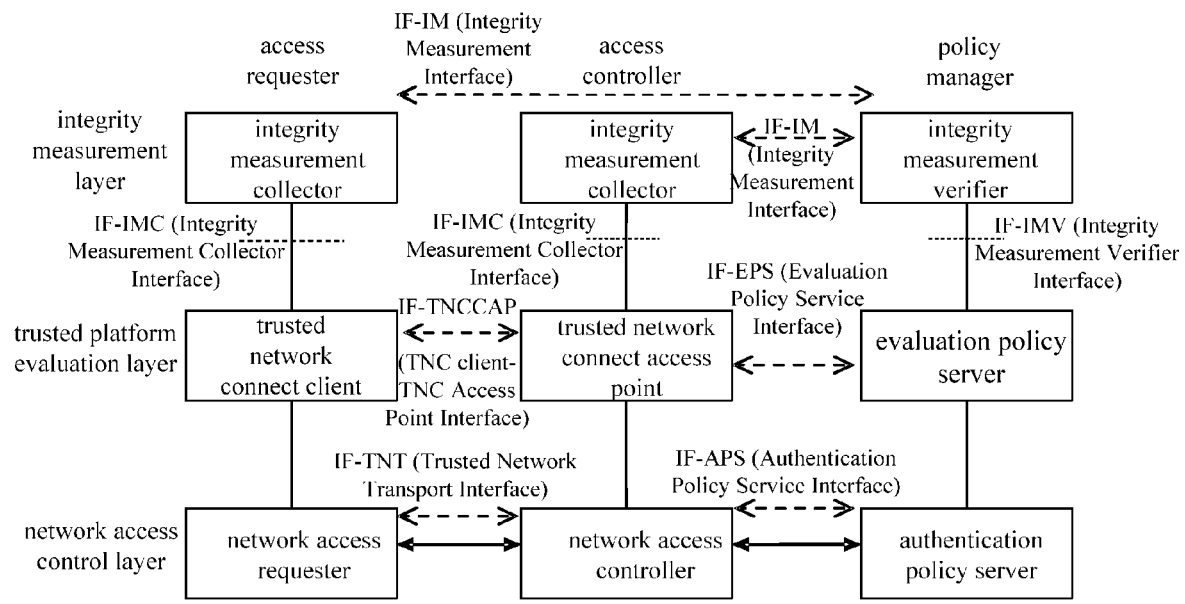
FIG. 2 is a structural diagram of an existing TePA-based TNC architecture.
Figure 3:
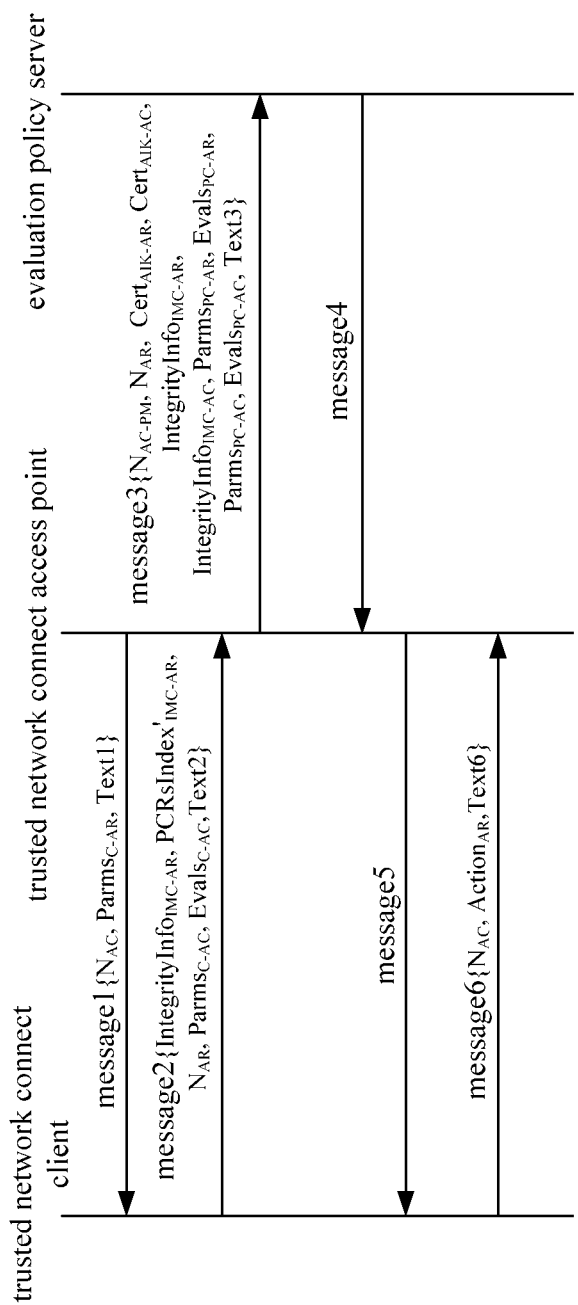
FIG. 3 illustrates a platform authentication protocol for a TePA-based TNC architecture according to the present invention with a structural diagram.

As shown in FIG. 3, the present invention provides a platform authentication method suitable for a trusted network connect architecture based on tri-element peer authentication, which may be a tri-element peer authentication protocol performed by a TNC client, a TNC access point and an evaluation policy server. Specifically, the TNC client and the TNC access point request an integrity measurement value of each other's platform, the TNC client and the TNC access point verify only a platform signature of the integrity measurement value of each other's platform, and the validity of the platform identity certificates and the evaluation of the integrity measurement values are performed by the evaluation policy server. The platform identity certificate may be a platform Attestation Identity Key (AIK) certificate in the TCG-TNC architecture. The method may include the steps below.

1) The TNC access point generates an integrity measurement parameter for the access requester $Parms_{C-AR}$ according to an evaluation policy, and then sends a message 1 to the TNC client. The message 1 may include a platform authentication activation challenge from the access controller $N_{AC}$, an integrity measurement parameter for the access requester $Parms_{C-AR}$, and another parameter Text1.

2) Upon receipt of the message 1, the TNC client sends firstly the integrity measurement parameter for the access requester $Parms_{C-AR}$ to an IMC in the corresponding access requester, then the TNC client obtains an integrity measurement value of the access requester $IntegrityInfo_{IMC-AR}$ (including PCR index data of the access requester $PCRsIndex_{IMC-AR}$) returned by the IMC in the access requester; if the integrity measurement value of the access requester $IntegrityInfo_{IMC-AR}$ is unknowable to a trusted platform evaluation layer component (the encoding methods are different, or integrity measurement layer protection is enabled, e.g., a protection applied between an IMC in the access requester and an IMV in the policy manager), then the IMC in the access requester also needs to return PCR index data of the access requester knowable to a trusted platform evaluation layer component $PCRsIndex'_{IMC-AR}$; and finally, the TNC client sends a message 2 to the access controller, and the message 2 may include the integrity measurement value of the access requester $IntegrityInfo_{IMC-AR}$, the PCR index data of the access requester knowable to a trusted platform evaluation layer component $PCRsIndex'_{IMC-AR}$, a platform authentication request challenge from the access requester $N_{AR}$, an integrity measurement parameter for the access controller $Parms_{C-AC}$, an evaluation policy for the integrity measurement value of the access controller $Evals_{C-AC}$, and another parameter Text2. The integrity measurement value of the access requester $IntegrityInfo_{IMC-AR}$ may be an integrity measurement layer message, and may be in the integrity report format or the IF-M message format as in the TCG-TNC architecture (it may be provided with a protection between the access requester and the policy manager, or may also be provided with a protection between the IMC in the access requester and the IMV in the policy manager). The PCR index data of the access requester knowable to a trusted platform evaluation layer component $PCRsIndex'_{IMC-AR}$ may be in the QuoteData format in an integrity report as in the TCG-TNC architecture.

3) Upon receipt of the message 2, the TNC access point verifies firstly a platform signature in the PCR index data of the access requester knowable to a trusted platform evaluation layer component $PCRsIndex'_{IMC-AR}$, e.g., AIK signature, and if the verification fails, then the message is discarded, otherwise, the TNC access point sends the integrity measurement parameter for the access controller $Parms_{C-AC}$ to the IMC in the corresponding access controller, and obtains the integrity measurement value of the access controller $IntegrityInfo_{IMC-AC}$ (including the PCR index data of the access controller $PCRsIndex_{IMC-AC}$) returned by the IMC in the access controller; if the integrity measurement value of the access controller $IntegrityInfo_{IMC-AC}$ is unknowable to a trusted platform evaluation layer component, e.g., the encoding methods may be different or integrity measurement layer protection may be enabled, which may be a protection applied between the IMC in the access controller and the IMV in the policy manager, then the IMC in the access controller also needs to return the PCR index data of the access controller knowable to a trusted platform evaluation layer component $PCRsIndex'_{IMC-AC}$; and finally, the TNC access point sends a message 3 to the evaluation policy server, and the message 3 may include a platform authentication verification challenge from the access controller $N_{AC-PM}$, a platform authentication request challenge from the access requester $N_{AR}$, an AIK certificate of the access requester $Cert_{AIK-AR}$, an AIK certificate of the access controller $Cert_{AIK-AC}$, an integrity measurement value of the access requester $IntegrityInfo_{IMC-AR}$, an integrity measurement value of the access controller $IntegrityInfo_{IMC-AC}$, an integrity measurement parameter for the access requester that is actually measured $Parms_{PC-AR}$, an evaluation policy for the integrity measurement value of the access requester that is actually measured $Evals_{PC-AR}$, integrity measurement parameter for the access controller that is actually measured $Parms_{PC-AC}$, an evaluation policy for the integrity measurement value of the access controller that is actually measured $Evals_{PC-AC}$, and another parameter Text3. The integrity measurement value of the access controller $IntegrityInfo_{IMC-AC}$ may be an integrity measurement layer message, and may be in the integrity report format or the IF-M message format as in the TCG-TNC architecture (it may be provided with a protection between the access controller and the policy manager, or may also be provided with a protection between the IMC in the access controller and the IMV in the policy manager). The integrity measurement parameter for the access requester that is actually measured $Parms_{PC-AR}$, is the part of the integrity measurement parameter for the access requester $Parms_{C-AR}$ that has been measured and is determined according to a message type in the encapsulation of the integrity measurement value of the access requester $IntegrityInfo_{IMC-AR}$. The evaluation policy for the integrity measurement value of the access requester that is actually measured $Evals_{PC-AR}$, is generated according to a message type in the encapsulation of the integrity measurement value of the access requester $IntegrityInfo_{IMC-AR}$ as well as a local evaluation policy, and the evaluation policy for the integrity measurement value of the access requester that is actually measured $Evals_{PC-AR}$ may be provided with a protection between the access controller and the policy manager. The integrity measurement parameter for the access controller that is actually measured $Parms_{PC-AC}$, is the part of the integrity measurement parameter for the access controller $Parms_{C-AC}$ that has been measured and is determined according to a message type in the encapsulation of the integrity measurement value of the access controller $IntegrityInfo_{IMC-AC}$. The evaluation policy for the integrity measurement value of the access controller that is actually measured $Evals_{PC-AC}$, is the part of the evaluation policy for the integrity measurement value of the access controller $Evals_{C-AC}$ that has been measured and is determined according to a message type in the encapsulation of the integrity measurement value of the access controller $IntegrityInfo_{IMC-AC}$.

4) Upon receipt of the message 3, the evaluation policy server may process the message 3 in one of the following two manners and sends a message 4 to the TNC access point.

a) First manner, where the verification of the validity of the AIK certificate and the evaluation of the integrity measurement value both are performed in a centralized manner.

a.1) The evaluation policy server verifies the validity of the AIK certificate of the access requester $Cert_{AIK-AR}$ and generates an AIK certificate verification result for the access requester $Re_{AIK-AR}$, and the evaluation policy server verifies the validity of the AIK certificate of the access controller $Cert_{AIK-AC}$ and generates an AIK certificate verification result for the access controller $Re_{AIK-AC}$.

a.2) If the AIK certificate of the access requester $Cert_{AIK-AR}$ is valid, then the evaluation policy server firstly sets, according to the integrity measurement parameter for the access requester that is actually measured $Parms_{PC-AR}$ and the evaluation policy for the integrity measurement value of the access requester that is actually measured $Evals_{PC-AR}$, an IMV in a corresponding policy manager; secondly, the evaluation policy server sends the integrity measurement value of the access requester $IntegrityInfo_{IMC-AR}$ to the IMV in the policy manager in which the evaluation policy is set; next the IMV in the policy manager in which the evaluation policy is set evaluates the integrity measurement value of the access requester $IntegrityInfo_{IMC-AR}$ and returns a component-level evaluation result for the integrity measurement value of the access requester $Res_{IMV-AR}$, component-level remediation information for the integrity measurement value of the access requester $Rems_{IMV-AR}$, and component-level fault information for the integrity measurement value of the access requester $Faults_{IMV-AR}$. They are integrity measurement layer information, and may be provided with protections between the access requester and the policy manager, as well as protections between the IMC in the access requester and the IMV in the policy manager. If the integrity measurement value of the access requester $IntegrityInfo_{IMC-AR}$ is unknowable to a trusted platform evaluation layer component (the encoding methods are different or integrity measurement layer protection is enabled, e.g., a protection applied between an IMC in the access requester and an IMV in the policy manager), then the IMV in the policy manager in which the evaluation policy is set also needs to return PCR index data of the access requester knowable to a trusted platform evaluation layer component $PCRsIndex'_{IMC-AR}$; and if the component-level evaluation result for the integrity measurement value of the access requester $Res_{IMV-AR}$ is unknowable to a trusted platform evaluation layer component, then the IMV in the policy manager in which the evaluation policy is set also needs to return a component-level evaluation result for the integrity measurement value of the access requester knowable to a trusted platform evaluation layer component $Res'_{IMV-AR}$.

a.3) If the AIK certificate of the access controller $Cert_{AIK-AC}$ is valid, then the evaluation policy server firstly sets, according to the integrity measurement parameter for the access controller that is actually measured $Parms_{PC-AC}$ and the evaluation policy for the integrity measurement value of the access controller that is actually measured $Evals_{PC-AC}$, an IMV in a corresponding policy manager; secondly, the evaluation policy server sends the integrity measurement value of the access controller $IntegrityInfo_{IMC-AC}$ to the IMV in the policy manager in which the evaluation policy is set; next the IMV in the policy manager in which the evaluation policy is set evaluates the integrity measurement value of the access controller $IntegrityInfo_{IMC-AC}$ and returns a component-level evaluation result for the integrity measurement value of the access controller $Res_{IMV-AC}$, component-level remediation information for the integrity measurement value of the access controller $Rems_{IMV-AC}$, and component-level fault information for the integrity measurement value of the access controller $Faults_{IMV-AC}$. They are integrity measurement layer information, and may be provided with protections between the access controller and the policy manager, as well as protections between the IMC in the access controller and the IMV in the policy manager. If the integrity measurement value of the access controller $IntegrityInfo_{IMC-AC}$ is unknowable to a trusted platform evaluation layer component (the encoding methods are different or integrity measurement layer protection is enabled, for example, a protection between the IMC in the access controller and the IMV in the policy manager), then the IMV in the policy manager in which the evaluation policy is set also needs to return PCR index data of the access controller knowable to a trusted platform evaluation layer component $PCRsIndex'_{IMC-AC}$; and if the component-level evaluation result for the integrity measurement value of the access controller $Res_{IMV-AC}$ is unknowable to a trusted platform evaluation layer component, then the IMV in the policy manager in which the evaluation policy is set also needs to return a component-level evaluation result for the integrity measurement value of the access controller knowable to a trusted platform evaluation layer component $Res'_{IMV-AC}$.

a.4) The signatures on the verification result of the validity of the AIK certificate and on the evaluation result of the integrity measurement value may be signed in a centralized manner, or may be signed in a separate manner.

a.4.1) In the separated case, the evaluation policy server sends a message 4 to the TNC access point, and the message 4 may include the AIK certificate verification result for the access requester $Re_{AIK-AR}$, the component-level evaluation result for the integrity measurement value of the access requester $Res_{IMV-AR}$, the component-level remediation information for the integrity measurement value of the access requester $Rems_{IMV-AR}$, the component-level evaluation result for the integrity measurement value of the access requester knowable to a trusted platform evaluation layer component $Res'_{IMV-AR}$, the component-level fault information for the integrity measurement value of the access requester $Faults_{IMV-AR}$, the AIK certificate verification result for the access controller $Re_{AIK-AC}$, the component-level evaluation result for the integrity measurement value of the access controller $Res_{IMV-AC}$, the component-level remediation information for the integrity measurement value of the access controller $Rems_{IMV-AC}$, the component-level evaluation result for the integrity measurement value of the access controller knowable to a trusted platform evaluation layer component $Res'_{IMV-AC}$, the component-level fault information for the integrity measurement value of the access controller $Faults_{IMV-AC}$, a separate signature 1 $Sig1_{PM}$, a separate signature 2 $Sig2_{PM}$, and a parameter Text4. The separate signature 1 $Sig1_{PM}$ is a signature signed by the policy manager by using a private key corresponding to its user certificate on the platform authentication verification challenge from the access controller $N_{AC-PM}$, the platform identity certificate of the access requester $Cert_{AIK-AR}$, the platform identity certificate verification result for the access requester $Re_{AIK-AR}$, the integrity measurement parameter for the access requester that is actually measured $Parms_{PC-AR}$, the evaluation policy for the integrity measurement value of the access requester that is actually measured $Evals_{PC-AR}$, the PCR index data of the access requester knowable to a trusted platform evaluation layer component $PCRsIndex'_{IMC-AR}$, the component-level evaluation result for the integrity measurement value of the access requester knowable to a trusted platform evaluation layer component $Res'_{IMV-AR}$, and a parameter Text7. The separate signature 2 $Sig2_{PM}$ is a signature signed by the policy manager by using the private key corresponding to its user certificate on the platform authentication request challenge from the access requester $N_{AR}$, the platform identity certificate of the access controller $Cert_{AIK-AC}$, platform identity certificate verification result for the access controller $Re_{AIK-AC}$, integrity measurement parameter for the access controller that is actually measured $Parms_{PC-AC}$, evaluation policy for the integrity measurement value of the access controller that is actually measured $Evals_{PC-AC}$, the PCR index data of the access controller knowable to a trusted platform evaluation layer component $PCRsIndex'_{IMC-AC}$, the component-level evaluation result for the integrity measurement value of the access controller knowable to a trusted platform evaluation layer component $Res'_{IMV-AC}$, and a parameter Text8. If the platform identity certificate of the access requester $Cert_{AIK-AR}$ is invalid, then the parameters related to the evaluation of the integrity measurement value of the access requester are set to be NULL or not exist; and if the platform identity certificate of the access controller $Cert_{AIK-AC}$ is invalid, then the parameters related to the evaluation of the integrity measurement value of the access controller are set to be NULL or not exist.

a.4.2) In the centralized case, the evaluation policy server sends a message 4 to the TNC access point, and the message 4 may include the AIK certificate verification result for the access requester $Re_{AIK-AR}$, the component-level evaluation result for the integrity measurement value of the access requester $Res_{IMV-AR}$, the component-level remediation information for the integrity measurement value of the access requester $Rems_{IMV-AR}$, the component-level evaluation result for the integrity measurement value of the access requester knowable to a trusted platform evaluation layer component $Res'_{IMV-AR}$, the component-level fault information for the integrity measurement value of the access requester $Faults_{IMV-AR}$, the AIK certificate verification result for the access controller $Re_{AIK-AC}$, the component-level evaluation result for the integrity measurement value of the access controller $Res_{IMV-AC}$, the component-level remediation information for the integrity measurement value of the access controller $Rems_{IMV-AC}$, the component-level evaluation result for the integrity measurement value of the access controller knowable to a trusted platform evaluation layer component $Res'_{IMV-AC}$, the component-level fault information for the integrity measurement value of the access controller $Faults_{IMV-AC}$, a separate signature $Sig_{PM}$, and another parameter Text4. The separate signature $Sig_{PM}$ is a signature signed by a policy manager by using the private key corresponding to its user certificate on the platform authentication verification challenge from the access controller $N_{AC-PM}$, the AIK certificate of the access requester $Cert_{AIK-AR}$, the AIK certificate verification result for the access requester $Re_{AIK-AR}$, the integrity measurement parameter for the access requester that is actually measured $Parms_{PC-AR}$, the evaluation policy for the integrity measurement value of the access requester that is actually measured $Evals_{PC-AR}$, the PCR index data of the access requester knowable to a trusted platform evaluation layer component $PCRsIndex'_{IMC-AR}$, the component-level evaluation result for the integrity measurement value of the access requester knowable to a trusted platform evaluation layer component $Res'_{IMV-AR}$, the platform authentication request challenge from the access requester $N_{AR}$, the AIK certificate of the access controller $Cert_{AIK-AC}$, the AIK certificate verification result for the access controller $Re_{AIK-AC}$, the integrity measurement parameter for the access controller that is actually measured $Parms_{PC-AC}$, the evaluation policy for the integrity measurement value of the access controller that is actually measured $Evals_{PC-AC}$, the PCR index data of the access controller knowable to a trusted platform evaluation layer component $PCRsIndex'_{IMC-AC}$, the component-level evaluation result for the integrity measurement value of the access controller knowable to a trusted platform evaluation layer component $Res'_{IMV-AC}$, and another parameter Text7. If the AIK certificate of the access requester $Cert_{AIK-AR}$ is invalid, then the parameters related to the evaluation of the integrity measurement value of the access requester are set to be NULL or not exist; and if the AIK certificate of the access controller $Cert_{AIK-AC}$ is invalid, then the parameters related to the evaluation of the integrity measurement value of the access controller are set to be NULL or not exist;

b) Second manner, where the validity of the verification of the platform identity certificate and the evaluation of the integrity measurement value are performed in a separate manner.

b.1) The evaluation policy server verifies the validity of the AIK certificate of the access requester $Cert_{AIK-AR}$ and generates an AIK certificate verification result for the access requester $Re_{AIK-AR}$, and the evaluation policy server verifies the validity of the AIK certificate of the access controller $Cert_{AIK-AC}$ and generates an AIK certificate verification result for the access controller $Re_{AIK-AC}$.

b.2) The signatures on the verification result of the validity of the AIK certificate may be signed in a centralized manner, or may be signed in a separate manner.

b.2.1) In the separated case, the AIK certificate validity verification part of the message 4 may include the AIK certificate verification result for the access requester $Re_{AIK-AR}$, the AIK certificate verification result for the access controller $Re_{AIK-AC}$, a certificate validity verification separate signature 1 $Sig1_{PM-AIK}$, and a certificate validity verification separate signature 2 $Sig2_{PM-AIK}$. The certificate validity verification separate signature 1 $Sig1_{PM-AIK}$ is a signature signed by using the private key corresponding to the user certificate on the platform authentication verification challenge from the access controller $N_{AC-PM}$, the AIK certificate of the access requester $Cert_{AIK-AR}$, the AIK certificate verification result for the access requester $Re_{AIK-AR}$, and a Text7. The certificate validity verification separate signature 2 $Sig2_{PM-AIK}$ is a signature signed by using the private key corresponding to the user certificate on the platform authentication request challenge from the access requester $N_{AR}$, the AIK certificate of the access controller $Cert_{AIK-AC}$, the AIK certificate verification result for the access controller $Re_{AIK-AC}$, and a Text8.

b.2.2) In the centralized case, the AIK certificate validity verification of the message 4 may include the AIK certificate verification result for the access requester $Re_{AIK-AR}$, the AIK certificate verification result for the access controller $Re_{AIK-AC}$, and a certificate validity verification separate signature $Sig_{PM-AIK}$. The certificate validity verification separate signature $Sig_{PM-AIK}$ is a signature signed by using the private key corresponding to the user certificate on the platform authentication verification challenge from the access controller $N_{AC-PM}$, the AIK certificate of the access requester $Cert_{AIK-AR}$, the AIK certificate verification result for the access requester $Re_{AIK-AR}$, the platform authentication request challenge from the access requester $N_{AR}$, the AIK certificate of the access controller $Cert_{AIK-AC}$, the AIK certificate verification result for the access controller $Re_{AIK-AC}$, and a Text7.

b.3) If the AIK certificate of the access requester $Cert_{AIK-AR}$ is valid, then the evaluation policy server firstly sets, according to the integrity measurement parameter for the access requester that is actually measured $Parms_{PC-AR}$ and the evaluation policy for the integrity measurement value of the access requester that is actually measured $Evals_{PC-AR}$, an IMV in a corresponding policy manager; secondly, the evaluation policy server sends the integrity measurement value of the access requester $IntegrityInfo_{IMC-AR}$ to the IMV in the policy manager in which the evaluation policy is set; next the IMV in the policy manager in which the evaluation policy is set evaluates the integrity measurement value of the access requester $IntegrityInfo_{IMC-AR}$ and returns a component-level evaluation result for the integrity measurement value of the access requester $Res_{IMV-AR}$, component-level remediation information for the integrity measurement value of the access requester $Rems_{IMV-AR}$, and component-level fault information for the integrity measurement value of the access requester $Faults_{IMV-AR}$. They are integrity measurement layer information, and may be provided with protections between the access requester and the policy manager, as well as protections between the IMC in the access requester and the IMV in the policy manager. If the integrity measurement value of the access requester $IntegrityInfo_{IMC-AR}$ is unknowable to a trusted platform evaluation layer component (the encoding methods are different or integrity measurement layer protection is enabled, e.g., a protection applied between an IMC in the access requester and an IMV in the policy manager), then the IMV in the policy manager in which the evaluation policy is set also needs to return PCR index data of the access requester knowable to a trusted platform evaluation layer component $PCRsIndex'_{IMC-AR}$; if the component-level evaluation result for the integrity measurement value of the access requester $Res_{IMV-AR}$ is unknowable to a trusted platform evaluation layer component, then the IMV in the policy manager in which the evaluation policy is set also needs to return a component-level evaluation result for the integrity measurement value of the access requester knowable to a trusted platform evaluation layer component $Res'_{IMV-AR}$.

b.4) If the AIK certificate of the access controller $Cert_{AIK-AC}$ is valid, then the evaluation policy server firstly sets, according to the integrity measurement parameter for the access controller that is actually measured $Parms_{PC-AC}$ and the evaluation policy for the integrity measurement value of the access controller that is actually measured $Evals_{PC-AC}$, an IMV in a corresponding policy manager; secondly, the evaluation policy server sends the integrity measurement value of the access controller $IntegrityInfo_{IMC-AC}$ to the IMV in the policy manager in which the evaluation policy is set; next the IMV in the policy manager in which the evaluation policy is set evaluates the integrity measurement value of the access controller $IntegrityInfo_{IMC-AC}$ and returns a component-level evaluation result for the integrity measurement value of the access controller $Res_{IMV-AC}$, component-level remediation information for the integrity measurement value of the access controller $Rems_{IMV-AC}$, and component-level fault information for the integrity measurement value of the access controller $Faults_{IMV-AC}$. They are integrity measurement layer information, and may be provided with protections between the access controller and the policy manager, as well as protections between the IMC in the access controller and the IMV in the policy manager. If the integrity measurement value of the access controller $IntegrityInfo_{IMC-AC}$ is unknowable to a trusted platform evaluation layer component (the encoding methods are different or integrity measurement layer protection is enabled, for example, a protection applied between the IMC in the access controller and the IMV in the policy manager), then the IMV in the policy manager in which the evaluation policy is set also needs to return PCR index data of the access controller knowable to a trusted platform evaluation layer component $PCRsIndex'_{IMC-AC}$; if the component-level evaluation result for the integrity measurement value of the access controller $Res_{IMV-AC}$ is unknowable to a trusted platform evaluation layer component, then the IMV in the policy manager in which the evaluation policy is set also needs to return a component-level evaluation result for the integrity measurement value of the access controller knowable to a trusted platform evaluation layer component $Res'_{IMV-AC}$.

b.5) The signatures on the evaluation result of the integrity measurement value may be signed in a centralized manner or in a separate manner.

b.5.1) In the separated case, the integrity measurement value evaluation part of the message 4 may include the component-level evaluation result for the integrity measurement value of the access requester $Res_{IMV-AR}$, the component-level remediation information for the integrity measurement value of the access requester $Rems_{IMV-AR}$, the component-level evaluation result for the integrity measurement value of the access requester knowable to a trusted platform evaluation layer component $Res'_{IMV-AR}$, the component-level fault information for the integrity measurement value of the access requester $Faults_{IMV-AR}$, the component-level evaluation result for the integrity measurement value of the access controller $Res_{IMV-AC}$, the component-level remediation information for the integrity measurement value of the access controller $Rems_{IMV-AC}$, the component-level evaluation result for the integrity measurement value of the access controller knowable to a trusted platform evaluation layer component $Res'_{IMV-AC}$, the component-level fault information for the integrity measurement value of the access controller $Faults_{IMV-AC}$, an integrity measurement value evaluation separate signature 1 $Sig1_{PM-IM}$, and an integrity measurement value evaluation separate signature 2 $Sig2_{PM-IM}$. The integrity measurement value evaluation separate signature 1 $Sig1_{PM-IM}$ is a signature signed by the policy manager by using the private key corresponding to its user certificate on the platform authentication verification challenge from the access controller $N_{AC-PM}$, the integrity measurement parameter for the access requester that is actually measured $Parms_{PC-AR}$, the evaluation policy for the integrity measurement value of the access requester that is actually measured $Evals_{PC-AR}$, the PCR index data of the access requester knowable to a trusted platform evaluation layer component $PCRsIndex'_{IMC-AR}$, the component-level evaluation result for the integrity measurement value of the access requester knowable to a trusted platform evaluation layer component $Res'_{IMV-AR}$, the component-level evaluation result for the integrity measurement value of the access controller $Res_{IMV-AC}$, the component-level remediation information for the integrity measurement value of the access controller $Rems_{IMV-AC}$, the component-level fault information for the integrity measurement value of the access controller $Faults_{IMV-AC}$, and another parameter Text9. The integrity measurement value evaluation separate signature 2 $Sig2_{PM-IM}$ is a signature signed by the policy manager by using the private key corresponding to its user certificate on the platform authentication request challenge from the access requester $N_{AR}$, the integrity measurement parameter for the access controller that is actually measured $Parms_{PC-AC}$, the evaluation policy for the integrity measurement value of the access controller that is actually measured $Evals_{PC-AC}$, the PCR index data of the access controller knowable to a trusted platform evaluation layer component $PCRsIndex'_{IMC-AC}$, the component-level evaluation result for the integrity measurement value of the access controller knowable to a trusted platform evaluation layer component $Res'_{IMV-AC}$, the component-level evaluation result for the integrity measurement value of the access requester $Res_{IMV-AR}$, the component-level remediation information for the integrity measurement value of the access requester $Rems_{IMV-AR}$, the component-level fault information for the integrity measurement value of the access requester $Faults_{IMV-AR}$, and another parameter Text10. If the AIK certificate of the access requester $Cert_{AIK-AR}$ is invalid, then the parameters related to the evaluation of the integrity measurement value of the access requester are set to be NULL or not exist; and if the platform identity certificate of the access controller $Cert_{AIK-AC}$ is invalid, then the parameters related to the evaluation of the integrity measurement value of the access controller are set to be NULL or not exist.

b.5.2) In the centralized case, the integrity measurement value evaluation part of the message 4 may include the component-level evaluation result for the integrity measurement value of the access requester $Res_{IMV-AR}$, the component-level remediation information for the integrity measurement value of the access requester $Rems_{IMV-AR}$, the component-level evaluation result for the integrity measurement value of the access requester knowable to a trusted platform evaluation layer component $Res'_{IMV-AR}$, the component-level fault information for the integrity measurement value of the access requester $Faults_{IMV-AR}$, the component-level evaluation result for the integrity measurement value of the access controller $Res_{IMV-AC}$, the component-level remediation information for the integrity measurement value of the access controller $Rems_{IMV-AC}$, the component-level evaluation result for the integrity measurement value of the access controller knowable to a trusted platform evaluation layer component $Res'_{IMV-AC}$, the component-level fault information for the integrity measurement value of the access controller $Faults_{IMV-AC}$, and an integrity measurement value evaluation separate signature $Sig_{PM-IM}$. The integrity measurement value evaluation separate signature $Sig_{PM-IM}$ is a signature signed by the policy manager by using the private key corresponding to its user certificate on the platform authentication verification challenge from the access controller $N_{AC-PM}$, the integrity measurement parameter for the access requester that is actually measured $Parms_{PC-AR}$, the evaluation policy for the integrity measurement value of the access requester that is actually measured $Evals_{PC-AR}$, the PCR index data of the access requester knowable to a trusted platform evaluation layer component $PCRsIndex'_{IMC-AR}$, the component-level evaluation result for the integrity measurement value of the access requester knowable to a trusted platform evaluation layer component $Res'_{IMV-AR}$, the platform authentication request challenge from the access requester $N_{AR}$, the integrity measurement parameter for the access controller that is actually measured $Parms_{PC-AC}$, the evaluation policy for the integrity measurement value of the access controller that is actually measured $Evals_{PC-AC}$, the PCR index data of the access controller knowable to a trusted platform evaluation layer component $PCRsIndex'_{IMC-AC}$, the component-level evaluation result for the integrity measurement value of the access controller knowable to a trusted platform evaluation layer component $Res'_{IMV-AC}$, the component-level evaluation result for the integrity measurement value of the access requester $Res_{IMV-AR}$, the component-level remediation information for the integrity measurement value of the access requester $Rems_{IMV-AR}$, the component-level fault information for the integrity measurement value of the access requester $Faults_{IMV-AR}$, the component-level evaluation result for the integrity measurement value of the access controller $Res_{IMV-AC}$, the component-level remediation information for the integrity measurement value of the access controller $Rems_{IMV-AC}$, the component-level fault information for the integrity measurement value of the access controller $Faults_{IMV-AC}$, and another parameter Text9. If the AIK certificate of the access requester $Cert_{AIK-AR}$ is invalid, then the parameters related to the evaluation of the integrity measurement value of the access requester are set to be NULL or not exist; and if the platform identity certificate of the access controller $Cert_{AIK-AC}$ is invalid, then the parameters related to the evaluation of the integrity measurement value of the access controller are set to be NULL or not exist.

b.6) The evaluation policy server sends message 4 to the TNC access point, and the message 4 may include the AIK certificate validity verification part of the message 4, the integrity measurement value evaluation part of the message 4, and another parameter Text4.

5) Upon receipt of the message 4, the TNC access point may perform the following processes.

c) If the message 4 received by the TNC access point is the message 4 sent in the step a.4.1), then the following processes will be performed.

c.1) The TNC access point verifies the validity of the separate signature 1 $Sig1_{PM}$, and the message is discarded if the separate signature 1 $Sig1_{PM}$ is invalid.

c.2) If the AIK certificate verification result for the access requester $Re_{AIK-AR}$ indicates that the AIK certificate of the access requester $Cert_{AIK-AR}$ is valid, then firstly it is verified whether the integrity measurement parameter for the access requester that is actually measured $Parms_{PC-AR}$ and the integrity measurement parameter for the access requester $Parms_{C-AR}$ are the same, and if not the same, then another around of the platform authentication protocol may be executed by using the difference between the integrity measurement parameter for the access requester that is actually measured $Parms_{PC-AR}$ and the integrity measurement parameter for the access requester $Parms_{C-AR}$, otherwise, the TNC access point generates, according to the component-level evaluation result for the integrity measurement value of the access requester knowable to a trusted platform evaluation layer component $Res'_{IMV-AR}$ in each round of the platform authentication protocol during the platform authentication, an access decision for the access controller $Action_{AC}$ (which indicates allowed/blocked/isolated, and may include the reason for this access decision), and sends the $Action_{AC}$ to the network access controller. If the AIK certificate verification result for the access requester $Re_{AIK-AR}$ indicates that the platform identity certificate of the access requester $Cert_{AIK-AR}$ is invalid, then the TNC access point generates the access decision for the access controller $Action_{AC}$ (the result is BLOCK, and the reason for this access decision is that the AIK certificate is invalid) and sends the access decision for the access controller $Action_{AC}$ to the network access controller.

c.3) If the access decision for the access controller $Action_{AC}$ is not BLOCK or the access decision for the access controller $Action_{AC}$ has not been generated, and if the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ exist and are not NULL, then the TNC access point sends, according to the message type, the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ to the corresponding IMC in the access controller.

c.4) The TNC access point sends a message 5 to the TNC client, and the message 5 may include the PCR index data of the access controller knowable to a trusted platform evaluation layer component $PCRsIndex'_{IMC-AC}$, the AIK certificate verification result for the access controller $Re_{AIK-AC}$, the integrity measurement parameter for the access controller that is actually measured $Parms_{PC-AC}$, the evaluation policy for the integrity measurement value of the access controller that is actually measured $Evals_{PC-AC}$, the component-level evaluation result for the integrity measurement value of the access controller knowable to a trusted platform evaluation layer component $Res'_{IMV-AC}$, the component-level evaluation result for the integrity measurement value of the access requester $Res_{IMV-AR}$, the component-level remediation information for the integrity measurement value of the access requester $Rems_{IMV-AR}$, the component-level fault information for the integrity measurement value of the access requester $Faults_{IMV-AR}$, the access decision for the access controller $Action_{AC}$, the separate signature 2 $Sig2_{PM}$ and another parameter Text5. If the AIK certificate of the access requester $Cert_{AIK-AR}$ is invalid, then the parameters related to the evaluation of the integrity measurement value of the access requester are set to be NULL or not exist; and if AIK certificate of the access controller $Cert_{AIK-AC}$ is invalid, then the parameters related to the evaluation of the integrity measurement value of the access controller are set to be NULL or not exist.

d) If the message 4 received by the TNC access point is the message 4 sent in the step a.4.2), then the following processes will be performed.

d.1) The TNC access point verifies the validity of the separate signature $Sig_{PM}$, and the message is discarded if the separate signature $Sig_{PM}$ is invalid.

d.2) If the AIK certificate verification result for the access requester $Re_{AIK-AR}$ indicates that the AIK certificate of the access requester $Cert_{AIK-AR}$ is valid, then firstly it is verified whether the integrity measurement parameter for the access requester that is actually measured $Parms_{PC-AR}$ and the integrity measurement parameter for the access requester $Parms_{C-AR}$ are the same, and if not the same, then another around of the platform authentication protocol may be executed by using the difference between the integrity measurement parameter for the access requester that is actually measured $Parms_{PC-AR}$ and the integrity measurement parameter for the access requester $Parms_{C-AR}$, otherwise, the TNC access point generates an access decision for the access controller $Action_{AC}$ according to the component-level evaluation result for the integrity measurement value of the access requester knowable to a trusted platform evaluation layer component $Res'_{IMV-AR}$ in each round of the platform authentication protocol during the platform authentication, and sends the access decision for the access controller $Action_{AC}$ to the network access controller (which indicates allowed/blocked/isolated, and may include the reason for this access decision). If the AIK certificate verification result for the access requester $Re_{AIK-AR}$ indicates that the AIK certificate of the access requester $Cert_{AIK-AR}$ is invalid, then the TNC access point generates the access decision for the access controller $Action_{AC}$ (the result is BLOCK, and the reason for this access decision is that the AIK certificate is invalid) and sends the access decision for the access controller $Action_{AC}$ to the network access controller.

d.3) If the access decision for the access controller $Action_{AC}$ is not BLOCK or the access decision for the access controller $Action_{AC}$ has not been generated, and if the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ exist and are not NULL, then the TNC access point sends, according to the message type, the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ to the corresponding IMC in the access controller.

d.4) The TNC access point sends a message 5 to the TNC client, and the message 5 may include the PCR index data of the access controller knowable to a trusted platform evaluation layer component $PCRsIndex'_{IMC-AC}$, the platform identity certificate verification result for the access controller $Re_{AIK-AC}$, the integrity measurement parameter for the access controller that is actually measured $Parms_{PC-AC}$, the evaluation policy for the integrity measurement value of the access controller that is actually measured $Evals_{PC-AC}$, the component-level evaluation result for the integrity measurement value of the access controller knowable to a trusted platform evaluation layer component $Res'_{IMV-AC}$, the component-level evaluation result for the integrity measurement value of the access requester $Res_{IMV-AR}$, the component-level remediation information for the integrity measurement value of the access requester $Rems_{IMV-AR}$, the component-level fault information for the integrity measurement value of the access requester $Faults_{IMV-AR}$, the access decision for the access controller $Action_{AC}$, the platform authentication verification challenge from the access controller $N_{AC-PM}$, the platform identity certificate verification result for the access requester $Re_{AIK-AR}$, the integrity measurement parameter for the access requester that is actually measured $Parms_{PC-AR}$, the evaluation policy for the integrity measurement value of the access requester that is actually measured $Evals_{PC-AR}$, the component-level evaluation result for the integrity measurement value of the access requester knowable to a trusted platform evaluation layer component $Res'_{IMV-AR}$, the separate signature $Sig_{PM}$ and another parameter Text5. If the AIK certificate of the access requester $Cert_{AIK-AR}$ is invalid, then the parameters related to the evaluation of the integrity measurement value of the access requester are set to be NULL or not exist; and if AIK certificate of the access controller $Cert_{AIK-AC}$ is invalid, then the parameters related to the evaluation of the integrity measurement value of the access controller are set to be NULL or not exist.

e) If the message 4 received by the TNC access point is the message 4 sent in the step b.6), and if the signatures in both the AIK certificate validity verification part and the integrity measurement value evaluation part are signed in a separate manner, then the following processes are performed.

e.1) The TNC access point verifies the validity of the certificate validity verification separate signature 1 $Sig1_{PM-AIK}$ and the integrity measurement value evaluation separate signature 1 $Sig1_{PM-IM}$, and the message is discarded if invalid.

e.2) If the AIK certificate verification result for the access requester $Re_{AIK-AR}$ indicates that the AIK certificate of the access requester $Cert_{AIK-AR}$ is valid, then firstly it is verified whether the integrity measurement parameter for the access requester that is actually measured $Parms_{PC-AR}$ and the integrity measurement parameter for the access requester $Parms_{C-AR}$ are the same, and if not the same, then another around of the platform authentication protocol may be executed by using the difference between the integrity measurement parameter for the access requester that is actually measured $Parms_{PC-AR}$ and the integrity measurement parameter for the access requester $Parms_{C-AR}$, otherwise, the TNC access point generates the access decision for the access controller $Action_{AC}$ (which indicates allowed/blocked/isolated, and may include the reason for this access decision) according to the component-level evaluation result for the integrity measurement value of the access requester knowable to a trusted platform evaluation layer component $Res'_{IMV-AR}$ in each round of the platform authentication protocol during the platform authentication, and sends the access decision for the access controller $Action_{AC}$ to the network access controller. If the AIK certificate verification result for the access requester $Re_{AIK-AR}$ indicates that the AIK certificate of the access requester $Cert_{AIK-AR}$ is invalid, then the TNC access point generates the access decision for the access controller $Action_{AC}$ (the result is BLOCK, and the reason for this access decision is that the AIK certificate is invalid) and sends the access decision for the access controller $Action_{AC}$ to the network access controller.

e.3) If the access decision for the access controller $Action_{AC}$ is not BLOCK or the access decision for the access controller $Action_{AC}$ has not been generated, and if the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ exist and are not NULL, then the TNC access point sends, according to the message type, the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ to the corresponding IMC in the access controller.

e.4) The TNC access point sends a message 5 to the TNC client, and the message 5 may include the PCR index data of the access controller knowable to a trusted platform evaluation layer component $PCRsIndex'_{IMC-AC}$, the AIK certificate verification result for the access controller $Re_{AIK-AC}$, the integrity measurement parameter for the access controller that is actually measured $Parms_{PC-AC}$, the evaluation policy for the integrity measurement value of the access controller that is actually measured $Evals_{PC-AC}$, the component-level evaluation result for the integrity measurement value of the access controller knowable to a trusted platform evaluation layer component $Res'_{IMV-AC}$, the component-level evaluation result for the integrity measurement value of the access requester $Res_{IMV-AR}$, the component-level remediation information for the integrity measurement value of the access requester $Rems_{IMV-AR}$, the component-level fault information for the integrity measurement value of the access requester $Faults_{IMV-AR}$, the access decision for the access controller $Action_{AC}$, the certificate validity verification separate signature 2 $Sig2_{PM-AIK}$, the integrity measurement value evaluation separate signature 2 $Sig2_{PM-IM}$, and another parameter Text5. If the AIK certificate of the access requester $Cert_{AIK-AR}$ is invalid, then the parameters related to the evaluation of the integrity measurement value of the access requester are set to be NULL or not exist; and if AIK certificate of the access controller $Cert_{AIK-AC}$ is invalid, then the parameters related to the evaluation of the integrity measurement value of the access controller are set to be NULL or not exist.

f) If the message 4 received by the TNC access point is the message 4 sent in the step b.6), and if the signatures in both the AIK certificate validity verification part and the integrity measurement value evaluation part are signed in a centralized manner, the following processes are performed.

f.1) The TNC access point verifies the validity of the certificate validity verification separate signature $Sig_{PM-AIK}$ and the integrity measurement value evaluation separate signature $Sig_{PM-IM}$, and the message is discarded if invalid.

f.2) If the AIK certificate verification result for the access requester $Re_{AIK-AR}$ indicates that the AIK certificate of the access requester $Cert_{AIK-AR}$ is valid, then firstly it is verified whether the integrity measurement parameter for the access requester that is actually measured $Parms_{PC-AR}$ and the integrity measurement parameter for the access requester $Parms_{C-AR}$ are the same, and if not the same, then another around of the platform authentication protocol may be executed by using the difference between the integrity measurement parameter for the access requester that is actually measured $Parms_{PC-AR}$ and the integrity measurement parameter for the access requester $Parms_{C-AR}$, otherwise, the TNC access point generates the access decision for the access controller $Action_{AC}$ (which indicates allowed/blocked/isolated, and may include the reason for this access decision) according to the component-level evaluation result for the integrity measurement value of the access requester knowable to a trusted platform evaluation layer component $Res'_{IMV-AR}$ in each round of the platform authentication protocol during the platform authentication, and sends the access decision for the access controller $Action_{AC}$ to the network access controller. If the AIK certificate verification result for the access requester $Re_{AIK-AR}$ indicates that the AIK certificate of the access requester $Cert_{AIK-AR}$ is invalid, then the TNC access point generates the access decision for the access controller $Action_{AC}$ (the result is BLOCK, and the reason for this access decision is that the AIK certificate is invalid) and sends the access decision for the access controller $Action_{AC}$ to the network access controller.

f.3) If the access decision for the access controller $Action_{AC}$ is not BLOCK or the access decision for the access controller $Action_{AC}$ has not been generated, and if the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ exist and are not NULL, then the TNC access point sends, according to the message type, the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ to the corresponding IMC in the access controller.

f.4) The TNC access point sends a message 5 to the TNC client, and the message 5 may include the PCR index data of the access controller knowable to a trusted platform evaluation layer component $PCRsIndex'_{IMC-AC}$, the AIK certificate verification result for the access controller $Re_{AIK-AC}$, the integrity measurement parameter for the access controller that is actually measured $Parms_{PC-AC}$, the evaluation policy for the integrity measurement value of the access controller that is actually measured $Evals_{PC-AC}$, the component-level evaluation result for the integrity measurement value of the access controller knowable to a trusted platform evaluation layer component $Res'_{IMV-AC}$, the component-level evaluation result for the integrity measurement value of the access requester $Res_{IMV-AR}$, the component-level remediation information for the integrity measurement value of the access requester $Rems_{IMV-AR}$, the component-level fault information for the integrity measurement value of the access requester $Faults_{IMV-AR}$, the access decision for the access controller $Action_{AC}$, the platform authentication verification challenge from the access controller $N_{AC-PM}$, the AIK certificate verification result for the access requester $Re_{AIK-AR}$, the integrity measurement parameter for the access requester that is actually measured $Parms_{PC-AR}$, the evaluation policy for the integrity measurement value of the access requester that is actually measured $Evals_{PC-AR}$, the component-level evaluation result for the integrity measurement value of the access requester knowable to a trusted platform evaluation layer component $Res'_{IMV-AR}$, the certificate validity verification separate signature $Sig_{PM-AIK}$, the integrity measurement value evaluation separate signature $Sig_{PM-IM}$, and another parameter Text5. If the AIK certificate of the access requester $Cert_{AIK-AR}$ is invalid, then the parameters related to the evaluation of the integrity measurement value of the access requester are set to be NULL or not exist; and if AIK certificate of the access controller $Cert_{AIK-AC}$ is invalid, then the parameters related to the evaluation of the integrity measurement value of the access controller are set to be NULL or not exist.

g) If the message 4 received by the TNC access point is the message 4 sent in the step b.6), and if the signatures in the AIK certificate validity verification part are signed in a separate manner and the signatures in the integrity measurement value evaluation part are signed in a centralized manner, then the following processes are performed.

g.1) The TNC access point verifies the validity of the certificate validity verification separate signature 1 $Sig1_{PM-AIK}$ and the integrity measurement value evaluation separate signature $Sig_{PM-IM}$, and the message is discarded if invalid.

g.2) If the AIK certificate verification result for the access requester $Re_{AIK-AR}$ indicates that the AIK certificate of the access requester $Cert_{AIK-AR}$ is valid, then firstly it is verified whether the integrity measurement parameter for the access requester that is actually measured $Parms_{PC-AR}$ and the integrity measurement parameter for the access requester $Parms_{C-AR}$ are the same, and if not the same, another around of the platform authentication protocol may be executed by using the difference between the integrity measurement parameter for the access requester that is actually measured $Parms_{PC-AR}$ and the integrity measurement parameter for the access requester $Parms_{C-AR}$, otherwise, the TNC access point generates the access decision for the access controller $Action_{AC}$ (which indicates allowed/blocked/isolated, and may include the reason for this access decision) according to the component-level evaluation result for the integrity measurement value of the access requester knowable to a trusted platform evaluation layer component $Res'_{IMV-AR}$ in each round of the platform authentication protocol during the platform authentication, and sends the access decision for the access controller $Action_{AC}$ to the network access controller. If the AIK certificate verification result for the access requester $Re_{AIK-AR}$ indicates that the AIK certificate of the access requester $Cert_{AIK-AR}$ is invalid, then the TNC access point generates the access decision for the access controller $Action_{AC}$ (the result is BLOCK, and the reason for this access decision is that the AIK certificate is invalid) and sends the access decision for the access controller $Action_{AC}$ to the network access controller.

g.3) If the access decision for the access controller $Action_{AC}$ is not BLOCK or the access decision for the access controller $Action_{AC}$ has not been generated, and if the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ exist and are not NULL, then the TNC access point sends, according to the message type, the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ to the corresponding IMC in the access controller.

g.4) The TNC access point sends a message 5 to the TNC client, and the message 5 may include the PCR index data of the access controller knowable to a trusted platform evaluation layer component $PCRsIndex'_{IMC-AC}$, the AIK certificate verification result for the access controller $Re_{AIK-AC}$, the integrity measurement parameter for the access controller that is actually measured $Parms_{PC-AC}$, the evaluation policy for the integrity measurement value of the access controller that is actually measured $Evals_{PC-AC}$, the component-level evaluation result for the integrity measurement value of the access controller knowable to a trusted platform evaluation layer component $Res'_{IMV-AC}$, the component-level evaluation result for the integrity measurement value of the access requester $Res_{IMV-AR}$, the component-level remediation information for the integrity measurement value of the access requester $Rems_{IMV-AR}$, the component-level fault information for the integrity measurement value of the access requester $Faults_{IMV-AR}$, the access decision for the access controller $Action_{AC}$, the platform authentication verification challenge from the access controller $N_{AC-PM}$, the integrity measurement parameter for the access requester that is actually measured $Parms_{PC-AR}$, the evaluation policy for the integrity measurement value of the access requester that is actually measured $Evals_{PC-AR}$, the component-level evaluation result for the integrity measurement value of the access requester knowable to a trusted platform evaluation layer component $Res'_{IMV-AR}$, the certificate validity verification separate signature 2 $Sig2_{PM-AIK}$, the integrity measurement value evaluation separate signature $Sig_{PM-IM}$, and another parameter Text5. If the AIK certificate of the access requester $Cert_{AIK-AR}$ is invalid, then the parameters related to the evaluation of the integrity measurement value of the access requester are set to be NULL or not exist; and if AIK certificate of the access controller Cert$_{AIK-AC}$ is invalid, then the parameters related to the evaluation of the integrity measurement value of the access controller are set to be NULL or not exist.

h) If the message 4 received by the TNC access point is the message 4 sent in the step b.6), and if the signatures in the AIK certificate validity verification part are signed in a centralized manner and the signatures in the integrity measurement value evaluation part are signed in a separate manner, then the following processes are performed.

h.1) The TNC access point verifies the validity of the certificate validity verification separate signature Sig$_{PM-AIK}$ and the integrity measurement value evaluation separate signature 1 Sig1$_{PM-IM}$, and the message is discarded if invalid.

h.2) If the AIK certificate verification result for the access requester Re$_{AIK-AR}$ indicates that the AIK certificate of the access requester Cert$_{AIK-AR}$ is valid, then firstly it is verified whether the integrity measurement parameter for the access requester that is actually measured Parms$_{PC-AR}$ and the integrity measurement parameter for the access requester Parms$_{C-AR}$ are the same, and if not the same, then another around of the platform authentication protocol may be executed by using the difference between the integrity measurement parameter for the access requester that is actually measured Parms$_{PC-AR}$ and the integrity measurement parameter for the access requester Parms$_{C-AR}$, otherwise, the TNC access point generates the access decision for the access controller Action$_{AC}$ (which indicates allowed/blocked/isolated, and may include the reason for this access decision) according to the component-level evaluation result for the integrity measurement value of the access requester knowable to a trusted platform evaluation layer component Res'$_{IMV-AR}$ in each round of the platform authentication protocol during the platform authentication, and sends the access decision for the access controller Action$_{AC}$ to the network access controller. If the AIK certificate verification result for the access requester Re$_{AIK-AR}$ indicates that the AIK certificate of the access requester Cert$_{AIK-AR}$ is invalid, then the TNC access point generates the access decision for the access controller Action$_{AC}$ (the result is BLOCK, and the reason for this access decision is that the AIK certificate is invalid) and sends the access decision for the access controller Action$_{AC}$ to the network access controller.

h.3) If the access decision for the access controller Action$_{AC}$ is not BLOCK or the access decision for the access controller Action$_{AC}$ has not been generated, and if the component-level evaluation result for the integrity measurement value of the access controller Res$_{IMV-AC}$, the component-level remediation information for the integrity measurement value of the access controller Rems$_{IMV-AC}$, and the component-level fault information for the integrity measurement value of the access controller Faults$_{IMV-AC}$ exist and are not NULL, then the TNC access point sends, according to the message type, the component-level evaluation result for the integrity measurement value of the access controller Res$_{IMV-AC}$, the component-level remediation information for the integrity measurement value of the access controller Rems$_{IMV-AC}$, and the component-level fault information for the integrity measurement value of the access controller Faults$_{IMV-AC}$ to the corresponding IMC in the access controller.

h.4) The TNC access point sends a message 5 to the TNC client, and the message 5 may include the PCR index data of the access controller knowable to a trusted platform evaluation layer component PCRsIndex'$_{IMC-AC}$, the AIK certificate verification result for the access controller Re$_{AIK-AC}$, the integrity measurement parameter for the access controller that is actually measured Parms$_{PC-AC}$, the evaluation policy for the integrity measurement value of the access controller that is actually measured Evals$_{PC-AC}$, the component-level evaluation result for the integrity measurement value of the access controller knowable to a trusted platform evaluation layer component Res'$_{IMV-AC}$, the component-level evaluation result for the integrity measurement value of the access requester Res$_{IMV-AR}$, the component-level remediation information for the integrity measurement value of the access requester Rems$_{IMV-AR}$, the component-level fault information for the integrity measurement value of the access requester Faults$_{IMV-AR}$, the access decision for the access controller Action$_{AC}$, the platform authentication verification challenge from the access controller N$_{AC-PM}$, the AIK certificate verification result for the access requester Re$_{AIK-AR}$, the certificate validity verification separate signature Sig$_{PM-AIK}$, the integrity measurement value evaluation separate signature 2 Sig2$_{PM-IM}$, and another parameter Text5. If the AIK certificate of the access requester Cert$_{AIK-AR}$ is invalid, then the parameters related to the evaluation of the integrity measurement value of the access requester are set to be NULL or not exist; and if AIK certificate of the access controller Cert$_{AIK-AC}$ is invalid, then the parameters related to the evaluation of the integrity measurement value of the access controller are set to be NULL or not exist.

6) Upon receipt of the message 5, the TNC client performs the following processes.

i) If the message 5 received by the TNC client is the message 5 sent in the step c.4), the following processes are performed.

i.1) If the access decision for the access controller Action$_{AC}$ is BLOCK, then the TNC client notifies the IMC in the access requester that platform remediation is not needed, and generates an access decision for the access requester Action$_{AR}$ (the result is BLOCK, and the reason for this access decision is that the access controller blocks the access) and sends the access decision for the access requester Action$_{AR}$ to the network access requester; otherwise, the step i.2) is performed.

i.2) The TNC client verifies the validity of the separate signature 2 Sig2$_{PM}$, if invalid, then the message is discarded. If the AIK certificate verification result for the access controller Re$_{AIK-AC}$ indicates that the AIK certificate of the access controller Cert$_{AIK-AC}$ is valid, then firstly it is verified whether the integrity measurement parameter for the access controller that is actually measured Parms$_{PC-AC}$ and the integrity measurement parameter for the access controller Parms$_{C-AC}$ are the same, and if not the same, then another around of the platform authentication protocol may be executed by using the difference between the integrity measurement parameter for the access controller that is actually measured Parms$_{PC-AC}$ and the integrity measurement parameter for the access controller Parms$_{C-AC}$, otherwise, the TNC access point generates the access decision for the access requester Action$_{AR}$ (which indicates allowed/blocked/isolated, and may include the reason for this access decision) according to the component-level evaluation result for the integrity measurement value of the access controller knowable to a trusted platform evaluation layer component Res'$_{IMV-AC}$ in each round of the platform authentication protocol during the platform authentication, and sends the access decision for the access requester Action$_{AR}$ to the network access requester. If the AIK certificate verification result for the access controller Re$_{AIK-AC}$ indicates that the AIK certificate of the access controller Cert$_{AIK-AC}$ is invalid, then the TNC client generates the access decision for the access requester Action$_{AR}$ (the result is BLOCK, and the reason for this access decision is that the AIK certificate is invalid) and sends the access decision for the access requester Action$_{AR}$ to the network access requester.

i.3) If the access decision for the access requester Action$_{AR}$ is not BLOCK or the access decision for the access requester Action$_{AR}$ has not been generated by the TNC client, and if the component-level evaluation result for the integrity measurement value of the access requester Res$_{IMV-AR}$, the component-level remediation information for the integrity measurement value of the access requester Rems$_{IMV-AR}$, and the component-level fault information for the integrity measurement value of the access requester Faults$_{IMV-AR}$ exist and are not NULL, then the TNC client sends, according to the message type, the component-level evaluation result for the integrity measurement value of the access requester Res$_{IMV-AR}$, the component-level remediation information for the integrity measurement value of the access requester Rems$_{IMV-AR}$, and the component-level fault information for the integrity measurement value of the access requester Faults$_{IMV-AR}$ to the corresponding IMC in the access request; and if the access decision for the access controller Action$_{AC}$ is not NULL, then the TNC client notifies the IMC in the access requester of the access decision for the access controller Action$_{AC}$.

i.4) When the TNC client has generated the access decision for the access requester Action$_{AR}$, it sends a message 6 to the TNC access point. The message 6 may include the platform authentication activation challenge from the access controller N$_{AC}$, the access decision of the access requester Action$_{AR}$, and another parameter Text6.

j) If the message 5 received by the TNC client is the message 5 sent in the step d.4), the following processes are performed.

j.1) If the access decision for the access controller Action$_{AC}$ is BLOCK, then the TNC client notifies the IMC in the access requester that platform remediation is not needed and generates an access decision for the access requester Action$_{AR}$ (the result is BLOCK, and the reason for this access decision is that the access controller blocks the access) and sends the access decision for the access requester Action$_{AR}$ to the network access requester; otherwise, then step j.2) is performed.

j.2) The TNC client verifies the validity of the separate signature Sig$_{PM}$, and the message is discarded if invalid. If the AIK certificate verification result for the access controller Re$_{AIK-AC}$ indicates that the AIK certificate of the access controller Cert$_{AIK-AC}$ is valid, then firstly it is verified whether the integrity measurement parameter for the access controller that is actually measured Parms$_{PC-AC}$ and the integrity measurement parameter for the access controller Parms$_{C-AC}$ are the same, and if not the same, then another around of the platform authentication protocol may be executed by using the difference between the integrity measurement parameter for the access controller that is actually measured Parms$_{PC-AC}$ and the integrity measurement parameter for the access controller Parms$_{C-AC}$, otherwise, the TNC access point generates the access decision for the access requester Action$_{AR}$ (which indicates allowed/blocked/isolated, and may include the reason for this access decision) according to the component-level evaluation result for the integrity measurement value of the access controller knowable to a trusted platform evaluation layer component Res'$_{IMV-AC}$ in each round of the platform authentication protocol during the platform authentication, and sends the access decision for the access requester Action$_{AR}$ to the network access requester. If the AIK certificate verification result for the access controller Re$_{AIK-AC}$ indicates that the AIK certificate of the access controller Cert$_{AIK-AC}$ is invalid, then the TNC client generates the access decision for the access requester Action$_{AR}$ (the result is BLOCK, and the reason for this access decision is that the AIK certificate is invalid) and sends the access decision for the access requester Action$_{AR}$ to the network access requester.

j.3) If the access decision for the access requester Action$_{AR}$ is not BLOCK or the access decision for the access requester Action$_{AR}$ has not been generated by the TNC client, and if the component-level evaluation result for the integrity measurement value of the access requester Res$_{IMV-AR}$, the component-level remediation information for the integrity measurement value of the access requester Rems$_{IMV-AR}$, and the component-level fault information for the integrity measurement value of the access requester Faults$_{IMV-AR}$ exist and are not NULL, then the TNC client sends, according to the message type, the component-level evaluation result for the integrity measurement value of the access requester Res$_{IMV-AR}$, the component-level remediation information for the integrity measurement value of the access requester Rems$_{IMV-AR}$, and the component-level fault information for the integrity measurement value of the access requester Faults$_{IMV-AR}$ to the corresponding IMC in the access request; and if the access decision for the access controller Action$_{AC}$ is not NULL, then the TNC client notifies the IMC in the access requester of the access decision for the access controller Action$_{AC}$.

j.4) When the TNC client has generated the access decision for the access requester Action$_{AR}$, it sends a message 6 to the TNC access point. The message 6 may include the platform authentication activation challenge from the access controller N$_{AC}$, the access decision of the access requester Action$_{AR}$, and another parameter Text6.

k) If the message 5 received by the TNC client is the message 5 sent in the step e.4), the following processes are performed.

k.1) If the access decision for the access controller Action$_{AC}$ is BLOCK, then the TNC client notifies the IMC in the access requester that platform remediation is not needed and generates the access decision for the access requester Action$_{AR}$ (the result is BLOCK, and the reason for this access decision is that the access controller blocks the access) and sends the access decision for the access requester Action$_{AR}$ to the network access requester; otherwise, the step k.2) is performed.

k.2) The TNC client verifies the validity of the certificate validity verification separate signature 2 Sig2$_{PM-AIK}$ and the integrity measurement value evaluation separate signature 2 Sig2$_{PM-IM}$, if invalid, then the message is discarded. If the AIK certificate verification result for the access controller Re$_{AIK-AC}$ indicates that the AIK certificate of the access controller Cert$_{AIK-AC}$ is valid, then firstly it is verified whether the integrity measurement parameter for the access controller that is actually measured Parms$_{PC-AC}$ and the integrity measurement parameter for the access controller Parms$_{C-AC}$ are the same, and if not the same, then another around of the platform authentication protocol may be executed by using the difference between the integrity measurement parameter for the access controller that is actually measured Parms$_{PC-AC}$ and the integrity measurement parameter for the access controller Parms$_{C-AC}$, otherwise the TNC access point generates the access decision for the access requester Action$_{AR}$ (which indicates allowed/blocked/isolated, and may include the reason for this access decision) according to the component-level evaluation result for the integrity measurement value of the access controller knowable to a trusted platform evaluation layer component Res'$_{IMV-AC}$ in each round of the platform authentication protocol during the platform authentication, and sends the access decision for the access requester Action$_{AR}$ to the network access requester. If the AIK certificate verification result for the access controller Re$_{AIK-AC}$ indicates that the AIK certificate of the access controller Cert$_{AIK-AC}$ is invalid, then the TNC client generates the access decision for the access requester Action$_{AR}$ (the result is BLOCK, and the reason for this access decision is that the AIK certificate is invalid) and sends the access decision for the access requester Action$_{AR}$ to the network access requester.

k.3) If the access decision for the access requester Action$_{AR}$ is not BLOCK or the access decision for the access requester Action$_{AR}$ has not been generated by the TNC client, and if the component-level evaluation result for the integrity measurement value of the access requester Res$_{IMV-AR}$, the component-level remediation information for the integrity measurement value of the access requester Rems$_{IMV-AR}$, and the component-level fault information for the integrity measurement value of the access requester Faults$_{IMV-AR}$ exist and are not NULL, then the TNC client sends, according to the message type, the component-level evaluation result for the integrity measurement value of the access requester Res$_{IMV-AR}$, the component-level remediation information for the integrity measurement value of the access requester Rems$_{IMV-AR}$, and the component-level fault information for the integrity measurement value of the access requester Faults$_{IMV-AR}$ to the corresponding IMC in the access request; and if the access decision for the access controller Action$_{AC}$ is not NULL, then the TNC client notifies the IMC in the access requester of the access decision for the access controller Action$_{AC}$.

k.4) When the TNC client has generated the access decision for the access requester Action$_{AR}$, it sends a message 6 to the TNC access point. The message 6 may include the platform authentication activation challenge from the access controller N$_{AC}$, the access decision of the access requester Action$_{AR}$, and another parameter Text6.

l) If the message 5 received by the TNC client is the message 5 sent in the step f.4), the following processes are performed.

l.1) If the access decision for the access controller Action$_{AC}$ is BLOCK, then the TNC client notifies the IMC in the access requester that platform remediation is not needed, and generates the access decision for the access requester Action$_{AR}$ (the result is BLOCK, and the reason for this access decision is that the access controller blocks the access) and sends the access decision for the access requester Action$_{AR}$ to the network access requester; otherwise, the step l.2) is performed.

l.2) The TNC client verifies the validity of the certificate validity verification separate signature Sig$_{PM-AIK}$ and the integrity measurement value evaluation separate signature Sig$_{PM-IM}$, and the message is discarded if invalid. If the AIK certificate verification result for the access controller Re$_{AIK-AC}$ indicates that the AIK certificate of the access controller Cert$_{AIK-AC}$ is valid, then firstly it is verified whether the integrity measurement parameter for the access controller that is actually measured Parms$_{PC-AC}$ and the integrity measurement parameter for the access controller Parms$_{C-AC}$ are the same, and if not the same, then another around of the platform authentication protocol may be executed by using the difference between the integrity measurement parameter for the access controller that is actually measured Parms$_{PC-AC}$ and the integrity measurement parameter for the access controller Parms$_{C-AC}$, otherwise, the TNC access point generates the access decision for the access requester Action$_{AR}$ (which indicates allowed/blocked/isolated, and may include the reason for this access decision) according to the component-level evaluation result for the integrity measurement value of the access controller knowable to a trusted platform evaluation layer component Res'$_{IMV-AC}$ in each round of the platform authentication protocol during the platform authentication, and sends the access decision for the access requester Action$_{AR}$ to the network access requester. If the AIK certificate verification result for the access controller Re$_{AIK-AC}$ indicates that the AIK certificate of the access controller Cert$_{AIK-AC}$ is invalid, then the TNC client generates the access decision for the access requester Action$_{AR}$ (the result is BLOCK, and the reason for this access decision is that the AIK certificate is invalid) and sends the access decision for the access requester Action$_{AR}$ to the network access requester.

l.3) If the access decision for the access requester Action$_{AR}$ is not BLOCK or the access decision for the access requester Action$_{AR}$ has not been generated by the TNC client, and if the component-level evaluation result for the integrity measurement value of the access requester Res$_{IMV-AR}$, the component-level remediation information for the integrity measurement value of the access requester Rems$_{IMV-AR}$, and the component-level fault information for the integrity measurement value of the access requester Faults$_{IMV-AR}$ exist and are not NULL, then by the TNC client sends, according to the message type, the component-level evaluation result for the integrity measurement value of the access requester Res$_{IMV-AR}$, the component-level remediation information for the integrity measurement value of the access requester Rems$_{IMV-AR}$, and the component-level fault information for the integrity measurement value of the access requester Faults$_{IMV-AR}$ to the corresponding IMC in the access request; and if the access decision for the access controller Action$_{AC}$ is not NULL, then the TNC client notifies the IMC in the access requester of the access decision for the access controller Action$_{AC}$.

l.4) When the TNC client has generated the access decision for the access requester Action$_{AR}$, it sends a message 6 to the TNC access point. The message 6 may include the platform authentication activation challenge from the access controller N$_{AC}$, the access decision of the access requester Action$_{AR}$, and another parameter Text6.

m) If the message 5 received by the TNC client is the message 5 sent in the step g.4), the following processes are performed.

m.1) If the access decision for the access controller Action$_{AC}$ is BLOCK, then the TNC client notifies the IMC in the access requester that platform remediation is not needed, and generates the access decision for the access requester Action$_{AR}$ (the result is BLOCK, and the reason for this access decision is that the access controller blocks the access) and sends the access decision for the access requester Action$_{AR}$ to the network access requester; otherwise, the step m.2) is performed.

m.2) The TNC client verifies the validity of the certificate validity verification separate signature 2 Sig2$_{PM-AIK}$ and the integrity measurement value evaluation separate signature Sig$_{PM-IM}$, and the message is discarded if invalid. If the AIK certificate verification result for the access controller Re$_{AIK-AC}$ indicates that the AIK certificate of the access controller Cert$_{AIK-AC}$ is valid, then firstly it is verified whether the integrity measurement parameter for the access controller that is actually measured Parms$_{PC-AC}$ and the integrity measurement parameter for the access controller Parms$_{C-AC}$ are the same, and if not the same, then another around of the platform authentication protocol may be executed by using the difference between the integrity measurement parameter for the access controller that is actually measured Parms$_{PC-AC}$ and the integrity measurement parameter for the access controller Parms$_{C-AC}$, otherwise, the TNC access point generates the access decision for the access requester Action$_{AR}$ (which indicates allowed/blocked/isolated, and may include the reason for this access decision) according to the component-level evaluation result for the integrity measurement value of the access controller knowable to a trusted platform evaluation layer component Res'$_{IMV-AC}$ in each round of the platform authentication protocol during the platform authentication, and sends the access decision for the access requester $Action_{AR}$ to the network access requester. If the AIK certificate verification result for the access controller $Re_{AIK-AC}$ indicates that the AIK certificate of the access controller $Cert_{AIK-AC}$ is invalid, then the TNC client generates the access decision for the access requester $Action_{AR}$ (the result is BLOCK, and the reason for this access decision is that the AIK certificate is invalid) and sends the access decision for the access requester $Action_{AR}$ to the network access requester.

m.3) If the access decision for the access requester $Action_{AR}$ is not BLOCK or the access decision for the access requester $Action_{AR}$ has not been generated by the TNC client, and if the component-level evaluation result for the integrity measurement value of the access requester $Res_{IMV-AR}$, the component-level remediation information for the integrity measurement value of the access requester $Rems_{IMV-AR}$, and the component-level fault information for the integrity measurement value of the access requester $Faults_{IMV-AR}$ exist and are not NULL, then the TNC client sends, according to the message type, the component-level evaluation result for the integrity measurement value of the access requester $Res_{IMV-AR}$, the component-level remediation information for the integrity measurement value of the access requester $Rems_{IMV-AR}$, and the component-level fault information for the integrity measurement value of the access requester $Faults_{IMV-AR}$ to the corresponding IMC in the access request; and if the access decision for the access controller $Action_{AC}$ is not NULL, then the TNC client notifies the IMC in the access requester of the access decision for the access controller $Action_{AC}$.

m.4) When the TNC client has generated the access decision for the access requester $Action_{AR}$, it sends a message 6 to the TNC access point. The message 6 may include the platform authentication activation challenge from the access controller $N_{AC}$, the access decision of the access requester $Action_{AR}$, and another parameter Text6.

n) If the message 5 received by the TNC client is the message 5 sent in the step h.4), the following processes are performed.

n.1) If the access decision for the access controller $Action_{AC}$ is BLOCK, then the TNC client notifies the IMC in the access requester that platform remediation is not needed, and generates the access decision for the access requester $Action_{AR}$ (the result is BLOCK, and the reason for this access decision is that the access controller blocks the access) and sends the access decision for the access requester $Action_{AR}$ to the network access requester; otherwise, the step n.2) is performed.

n.2) The TNC client verifies the validity of the certificate validity verification separate signature $Sig_{PM-AIK}$ and the integrity measurement value evaluation separate signature 2 $Sig2_{PM-IM}$, and the message is discarded if invalid. If the AIK certificate verification result for the access controller $Re_{AIK-AC}$ indicates that the AIK certificate of the access controller $Cert_{AIK-AC}$ is valid, then firstly it is verified whether the integrity measurement parameter for the access controller that is actually measured $Parms_{PC-AC}$ and the integrity measurement parameter for the access controller $Parms_{C-AC}$ are the same, and if not the same, then another around of the platform authentication protocol may be executed by using the difference between the integrity measurement parameter for the access controller that is actually measured $Parms_{PC-AC}$ and the integrity measurement parameter for the access controller $Parms_{C-AC}$, otherwise, the TNC access point generates the access decision for the access requester $Action_{AR}$ (which indicates allowed/blocked/isolated, and may include the reason for this access decision) according to the component-level evaluation result for the integrity measurement value of the access controller knowable to a trusted platform evaluation layer component $Res'_{IMV-AC}$ in each round of the platform authentication protocol during the platform authentication, and sends the access decision for the access requester $Action_{AR}$ to the network access requester. If the AIK certificate verification result for the access controller $Re_{AIK-AC}$ indicates that the AIK certificate of the access controller $Cert_{AIK-AC}$ is invalid, then the TNC client generates the access decision for the access requester $Action_{AR}$ (the result is BLOCK, and the reason for this access decision is that the AIK certificate is invalid) and sends the access decision for the access requester $Action_{AR}$ to the network access requester.

n.3) If the access decision for the access requester $Action_{AR}$ is not BLOCK or the access decision for the access requester $Action_{AR}$ has not been generated by the TNC client, and if the component-level evaluation result for the integrity measurement value of the access requester $Res_{IMV-AR}$, the component-level remediation information for the integrity measurement value of the access requester $Rems_{IMV-AR}$, and the component-level fault information for the integrity measurement value of the access requester $Faults_{IMV-AR}$ exist and are not NULL, then the TNC client sends, according to the message type, the component-level evaluation result for the integrity measurement value of the access requester $Res_{IMV-AR}$, the component-level remediation information for the integrity measurement value of the access requester $Rems_{IMV-AR}$, and the component-level fault information for the integrity measurement value of the access requester $Faults_{IMV-AR}$ to the corresponding IMC in the access request; and if the access decision for the access controller $Action_{AC}$ is not NULL, then the TNC client notifies the IMC in the access requester of the access decision for the access controller $Action_{AC}$.

n.4) When the TNC client has generated the access decision for the access requester $Action_{AR}$, it sends a message 6 to the TNC access point. The message 6 may include the platform authentication activation challenge from the access controller $N_{AC}$, the access decision of the access requester $Action_{AR}$, and another parameter Text6.

7) Upon receipt of the message 6, if the access decision for the access requester $Action_{AR}$ is BLOCK, then the TNC access point notifies the IMC in the access controller that platform remediation is not needed; if the access decision for the access requester $Action_{AR}$ is ISOLATE, then the TNC access point notifies the IMC in the access controller that platform remediation is needed.

In the platform authentication protocol according to the present invention, the messages between the TNC client and the TNC access point are transmitted in a secure channel between the access requester and the access controller. As a matter of course, the platform authentication protocol according to the present invention may be a two-way authentication protocol, or, may also be applied in one-way authentication. When it is applied in one-way authentication, the parameters related to the authentication in the other direction may be set to be NULL or not exist. The platform authentication method suitable for a trusted network connect architecture based on tri-element peer authentication may be implemented without the verification of the validity of the AIK certificate, for example, in a platform authentication process, after the first round of the platform authentication protocol, other rounds of the platform authentication protocol can be performed without the verification of the validity of the AIK certificate, with the parameters related to the verification of the validity of the AIK certificate set to be NULL or not exist.

The integrity measurement layer message can provide a protection between the integrity measurement collector and the integrity measurement verifier. If the IMV in the policy manager is implemented remotely, then a protection needs to be provided between the evaluation policy server and the IMV in the policy manager; the integrity measurement value of the access requester IntegrityInfo$_{IMC-AR}$, the evaluation policy for the integrity measurement value of the access controller Evals$_{C-AC}$, the component-level evaluation result for the integrity measurement value of the access requester Res$_{IMV-AR}$, the component-level remediation information for the integrity measurement value of the access requester Rems$_{IMV-AR}$, and the component-level fault information for the integrity measurement value of the access requester Faults$_{IMV-AR}$ may be provided with a protection between the access requester and the policy manager; and the integrity measurement value of integrity measurement value of the access controller IntegrityInfo$_{IMC-AC}$, the evaluation policy for the integrity measurement value of the access requester that is actually measured Evals$_{PC-AR}$, the component-level evaluation result for the integrity measurement value of the access requester Res$_{IMV-AC}$, the component-level remediation information for the integrity measurement value of the access controller Rems$_{IMV-AC}$, and the component-level fault information for the integrity measurement value of the access controller Faults$_{IMV-AC}$ may be provided with a protection between the access controller and the policy manager.

The integrity measurement parameter for the access requester Parms$_{C-AR}$, the integrity measurement parameter for the access controller Parms$_{PC-AC}$, the evaluation policy for the integrity measurement value of the access controller Evals$_{C-AC}$, the integrity measurement parameter for the access requester that is actually measured Parms$_{PC-AR}$, the evaluation policy for the integrity measurement value of the access requester that is actually measured Evals$_{PC-AR}$, the integrity measurement parameter for the access controller that is actually measured Parms$_{PC-AC}$, and the evaluation policy for the integrity measurement value of the access controller that is actually measured Evals$_{PC-AC}$ may be encapsulated in the format below:

| Message type | Integrity measurement parameter list | Evaluation policy list |
|---|---|---|
| Message type | Integrity measurement parameter list | Evaluation policy list |
| ... | ... | ... |

The integrity measurement value of the access requester IntegrityInfo$_{IMC-AR}$, the integrity measurement value of the access controller IntegrityInfo$_{IMC-AC}$, the component-level evaluation result for the integrity measurement value of the access requester Res$_{IMV-AR}$, the component-level remediation information for the integrity measurement value of the access requester Rems$_{IMV-AR}$, the component-level fault information for the integrity measurement value of the access requester Faults$_{IMV-AR}$, the component-level evaluation result for the integrity measurement value of the access requester Res$_{IMV-AC}$, the component-level remediation information for the integrity measurement value of the access controller Rems$_{IMV-AC}$, and the component-level fault information for the integrity measurement value of the access controller Faults$_{IMV-AC}$ all are integrity measurement layer messages, and their encapsulation format in the trusted platform evaluation layer may be as shown below:

| Message type | Integrity measurement collector identify | Integrity measurement layer message |
|---|---|---|
| Message type | Integrity measurement collector identify | Integrity measurement layer message |
| ... | ... | ... |

The PCR index data of the access requester knowable to a trusted platform evaluation layer component PCRsIndex'$_{IMC-AR}$, the PCR index data of the access controller knowable to a trusted platform evaluation layer component PCRsIndex'$_{IMC-AC}$, the component-level evaluation result for the integrity measurement value of the access requester knowable to a trusted platform evaluation layer component Res'$_{IMV-AR}$, and the component-level evaluation result for the integrity measurement value of the access requester knowable to a trusted platform evaluation layer component Res'$_{IMV-AC}$ may be encapsulated in the format below:

| Message type | PCR index data or component-level evaluation result knowable to a trusted platform evaluation layer component |
|---|---|
| Message type | PCR index data or component-level evaluation result knowable to a trusted platform evaluation layer component |
| ... | ... |

The embodiments of the present application disclosed herein shall not be interpreted as limiting the scope of protection of the present application. Any modifications, equivalents, improvements and the like within the scope of the present invention shall fall within the scope of protection of the present invention.

The invention claimed is:

1. A platform authentication method applied in a trusted network connect architecture based on tri-element peer authentication, wherein a TNC client, a TNC access point and an evaluation policy server perform a tri-element peer authentication protocol, and the platform authentication method applied in the trusted network connect architecture based on the tri-element peer authentication comprises:

interacting with messages, between the TNC access point and the TNC client, to request for an integrity measurement value of each other's platform, and verify a platform signature on the integrity measurement value of the each other's platform; and interacting with messages, between the TNC access point and the evaluation policy server, so that the evaluation policy server verifies validity of a platform identity certificate and evaluates the integrity measurement value, comprising:

step 1), generating, by the TNC access point, an integrity measurement parameter for an access requester Parms$_{C-AR}$ according to an evaluation policy; and sending, by the TNC access point, a message 1 to the TNC client, the message 1 comprising a platform authentication activation challenge from an access controller N$_{AC}$ and the integrity measurement parameter for the access requester Parms$_{C-AR}$; and step 2), sending, by the TNC client upon receipt of the message 1, a message 2 to the TNC access point, the message 2 comprising an integrity measurement value of the access requester IntegrityInfo$_{IMC-AR}$, PCR index data of the access requester knowable to a trusted platform evaluation layer component PCRsIndex'$_{IMC-AR}$, a platform authentication request challenge from the access requester N$_{AR}$, an integrity measurement parameter for the access controller $Parms_{C-AC}$, and an evaluation policy for an integrity measurement value of the access controller $Evals_{C-AC}$;

step 3), sending, by the TNC access point upon receipt of the message 2, a message 3 to the evaluation policy server, the message 3 comprising a platform authentication verification challenge from the access controller $N_{AC-PM}$, the platform authentication request challenge from the access requester $N_{AR}$, a platform identity certificate of the access requester $Cert_{AIK-AR}$, a platform identity certificate of the access controller $Cert_{AIK-AC}$, the integrity measurement value of the access requester $IntegrityInfo_{IMC-AR}$, an integrity measurement value of the access controller $IntegrityInfo_{IMC-AC}$, an integrity measurement parameter for the access requester that is actually measured $Parms_{PC-AR}$, an evaluation policy for the integrity measurement value of the access requester that is actually measured $Evals_{PC-AR}$, an integrity measurement parameter for the access controller that is actually measured $Parms_{PC-AC}$ and an evaluation policy for the integrity measurement value of the access controller that is actually measured $Evals_{PC-AC}$;

step 4), sending, by the evaluation policy server upon receipt of the message 3, a message 4 to the TNC access point; sending, by the TNC access point upon receipt of the message 4, a message 5 to the TNC client; and sending, by the TNC client upon receipt of the message 5, a message 6 to the TNC access point, the message 6 comprising the platform authentication activation challenge from the access controller $N_{AC}$ and an access decision for the access requester $Action_{AR}$; and step 5), upon receipt of the message 6, if the access decision for the access requester $Action_{AR}$ is BLOCK, then the TNC access point instructing an IMC in the access controller that platform remediation is not needed; if the access decision for the access requester $Action_{AR}$ is ISOLATE, then the TNC access point instructing the IMC in the access controller that platform remediation is needed.

2. The platform authentication method applied in a trusted network connect architecture based on tri-element peer authentication according to claim 1, wherein the step 2) comprises:

upon receipt of the message 1, the TNC client firstly sending, according to a message type in the integrity measurement parameter for the access requester $Parms_{C-AR}$, an integrity measurement parameter in the integrity measurement parameter for the access requester $Parms_{C-AR}$ to an IMC in the access requester in which the message type is registered; then, obtaining the integrity measurement value of the access requester $IntegrityInfo_{IMC-AR}$ returned by the IMC in the access requester; and, if the integrity measurement value of the access requester $IntegrityInfo_{IMC-AR}$ is unknowable to a trusted platform evaluation layer component, then obtaining the PCR index data of the access requester knowable to a trusted platform evaluation layer component $PCRsIndex'_{IMC-AR}$, which is also returned by the IMC in the access requester; and, finally, sending the message 2 to the access controller.

3. The platform authentication method applied in a trusted network connect architecture based on tri-element peer authentication according to claim 1, wherein the step 3) comprises:

firstly, verifying a platform signature in the PCR index data of the access requester knowable to a trusted platform evaluation layer component $PCRsIndex'_{IMC-AR}$; if the verification fails, then discarding the message, and if the verification succeeds, then sending, according to a message type in the integrity measurement parameter for the access controller $Parms_{C-AC}$, an integrity measurement parameter in the integrity measurement parameter for the access controller $Parms_{C-AC}$ to an IMC in the access controller in which the message type is registered, and obtaining the integrity measurement value of the access controller $IntegrityInfo_{IMC-AC}$ returned by the IMC in the access controller; and, if the integrity measurement value of the access controller $IntegrityInfo_{IMC-AC}$ is unknowable to a trusted platform evaluation layer component, then obtaining PCR index data of the access controller knowable to a trusted platform evaluation layer component $PCRsIndex'_{IMC-AC}$, which is also returned by the IMC in the access requester; and, finally, sending the message 3 to the evaluation policy server.

4. The platform authentication method applied in a trusted network connect architecture based on tri-element peer authentication according to claim 1, wherein when the verification of the validity of the platform identity certificate and the evaluation of the integrity measurement value both are performed in a centralized manner, and the signatures are signed in a separate manner, the step 4) comprises:

a.1) the evaluation policy server verifying the validity of the platform identity certificate of the access requester $Cert_{AIK-AR}$ and generating a platform identity certificate verification result for the access requester $Re_{AIK-AR}$, and verifying the validity of the platform identity certificate of the access controller $Cert_{AIK-AC}$ and generating a platform identity certificate verification result for the access controller $Re_{AIK-AC}$;

a.2) if the platform identity certificate of the access requester $Cert_{AIK-AR}$ is valid, then the evaluation policy server firstly setting, according to the integrity measurement parameter for the access requester that is actually measured $Parms_{PC-AR}$ and the evaluation policy for the integrity measurement value of the access requester that is actually measured $Evals_{PC-AR}$, an IMV in a corresponding policy manager, and sending the integrity measurement value of the access requester $IntegrityInfo_{IMC-AR}$ to the IMV in the policy manager in which the evaluation policy is set; then, the IMV in the policy manager in which the evaluation policy is set evaluating the integrity measurement value of the access requester $IntegrityInfo_{IMC-AR}$, and returning a component-level evaluation result for the integrity measurement value of the access requester $Res_{IMV-AR}$, component-level remediation information for the integrity measurement value of the access requester $Rems_{IMV-AR}$, and component-level fault information for the integrity measurement value of the access requester $Faults_{IMV-AR}$; and, if the integrity measurement value of the access requester $IntegrityInfo_{IMC-AR}$ is unknowable to a trusted platform evaluation layer component, then the IMV in the policy manager in which the evaluation policy is set also returning the PCR index data of the access requester knowable to a trusted platform evaluation layer component $PCRsIndex'_{IMC-AR}$; and, if the component-level evaluation result for the integrity measurement value of the access requester $Res_{IMV-AR}$ is unknowable to a trusted platform evaluation layer component, then the IMV in the policy manager in which the evaluation policy is set also returning a component-level evaluation result for the integrity measurement value of the access requester knowable to a trusted platform evaluation layer component $Res'_{IMV-AR}$;

a.3) if the platform identity certificate of the access controller $Cert_{AIK-AC}$ is valid, then the evaluation policy server firstly setting, according to the integrity measurement parameter for the access controller that is actually measured $Parms_{PC-AC}$ and the evaluation policy for the integrity measurement value of the access controller that is actually measured $Evals_{PC-AC}$, an IMV in a corresponding policy manager, and sending the integrity measurement value of the access controller Integrity $Info_{IMC-AC}$ to the IMV in the policy manager in which the evaluation policy is set; then, the IMV in the policy manager in which the evaluation policy is set evaluating the integrity measurement value of the access controller IntegrityInfo$_{IMC-AC}$, and returning a component-level evaluation result for the integrity measurement value of the access controller $Res_{IMV-AC}$, component-level remediation information for the integrity measurement value of the access controller $Rems_{IMV-AC}$, and component-level fault information for the integrity measurement value of the access controller $Faults_{IMV-AC}$; and, if the integrity measurement value of the access controller IntegrityInfo$_{IMC-AC}$ is unknowable to a trusted platform evaluation layer component, then the IMV in the policy manager in which the evaluation policy is set also returning PCR index data of the access controller knowable to a trusted platform evaluation layer component PCRsIndex'$_{IMC-AC}$; and, if the component-level evaluation result for the integrity measurement value of the access controller $Res_{IMV-AC}$ is unknowable to a trusted platform evaluation layer component, then the IMV in the policy manager in which the evaluation policy is set also returning a component-level evaluation result for the integrity measurement value of the access controller knowable to a trusted platform evaluation layer component Res'$_{IMV-AC}$;

a.4) the evaluation policy server sending the message 4 to the TNC access point, the message 4 comprising the platform identity certificate verification result for the access requester $Re_{AIK-AR}$, the component-level evaluation result for the integrity measurement value of the access requester $Res_{IMV-AR}$, the component-level remediation information for the integrity measurement value of the access requester $Rems_{IMV-AR}$, the component-level evaluation result for the integrity measurement value of the access requester knowable to a trusted platform evaluation layer component Res'$_{IMV-AR}$, the component-level fault information for the integrity measurement value of the access requester $Faults_{IMV-AR}$, the platform identity certificate verification result for the access controller $Re_{AIK-AC}$, the component-level evaluation result for the integrity measurement value of the access controller $Res_{IMV-AC}$, the component-level remediation information for the integrity measurement value of the access controller $Rems_{IMV-AC}$, the component-level evaluation result for the integrity measurement value of the access controller knowable to a trusted platform evaluation layer component Res'$_{IMV-AC}$, the component-level fault information for the integrity measurement value of the access controller $Faults_{IMV-AC}$, a separate signature 1 $Sig1_{PM}$, a separate signature 2 $Sig2_{PM}$, and a parameter Text4, where the separate signature 1 $Sig1_{PM}$ is a signature signed by the policy manager by using a private key corresponding to its user certificate on the platform authentication verification challenge from the access controller $N_{AC-PM}$, the platform identity certificate of the access requester $Cert_{AIK-AR}$, the platform identity certificate verification result for the access requester $Re_{AIK-AR}$, the integrity measurement parameter for the access requester that is actually measured $Parms_{PC-AR}$, the evaluation policy for the integrity measurement value of the access requester that is actually measured $Evals_{PC-AR}$, the PCR index data of the access requester knowable to a trusted platform evaluation layer component PCRsIndex'$_{IMC-AR}$, the component-level evaluation result for the integrity measurement value of the access requester knowable to a trusted platform evaluation layer component Res'$_{IMV-AR}$, and a parameter Text7, and the separate signature 2 $Sig2_{PM}$ is a signature signed by the policy manager by using a private key corresponding to its user certificate on the platform authentication request challenge from the access requester $N_{AR}$, the platform identity certificate of the access controller $Cert_{AIK-AC}$, the platform identity certificate verification result for the access controller $Re_{AIK-AC}$, the integrity measurement parameter for the access controller that is actually measured $Parms_{PC-AC}$, the evaluation policy for the integrity measurement value of the access controller that is actually measured $Evals_{PC-AC}$, the PCR index data of the access controller knowable to a trusted platform evaluation layer component PCRsIndex'$_{IMC-AC}$, the component-level evaluation result for the integrity measurement value of the access controller knowable to a trusted platform evaluation layer component Res'$_{IMV-AC}$, and a parameter Text8; and if the platform identity certificate of the access requester $Cert_{AIK-AR}$ is invalid, then the parameters related to the evaluation of the integrity measurement value of the access requester are set to be NULL or not exist; and if the platform identity certificate of the access controller $Cert_{AIK-AC}$ is invalid, then the parameters related to the evaluation of the integrity measurement value of the access controller are set to be NULL or not exist;

a.5) upon receipt of the message 4 sent by the evaluation policy server in the step a.4), the TNC access point performing the following process:

a.5.1) verifying the validity of the separate signature 1 $Sig1_{PM}$, and if the separate signature 1 $Sig1_{PM}$ is invalid, discarding the message;

a.5.2) if the platform identity certificate verification result for the access requester $Re_{AIK-AR}$ indicates that the platform identity certificate of the access requester $Cert_{AIK-AR}$ is valid, then verifying whether the integrity measurement parameter for the access requester that is actually measured $Parms_{PC-AR}$ and the integrity measurement parameter for the access requester $Parms_{C-AR}$ are the same, and if not the same, then executing another around of the platform authentication protocol by using a difference between the integrity measurement parameter for the access requester that is actually measured $Parms_{PC-AR}$ and the integrity measurement parameter for the access requester $Parms_{C-AR}$, otherwise, generating, according to the component-level evaluation result for the integrity measurement value of the access requester knowable to a trusted platform evaluation layer component Res'$_{IMV-AR}$ in each round of the platform authentication protocol during the platform authentication, an access decision for the access controller $Action_{AC}$ and sending the access decision for the access controller $Action_{AC}$ to the network access controller; if the platform identity certificate verification result for the access requester $Re_{AIK-AR}$ indicates that the platform identity certificate of the access requester $Cert_{AIK-AR}$ is invalid, then generating the access decision for the access controller $Action_{AC}$ and sending the access decision for the access controller $Action_{AC}$ to the network access controller;

a.5.3) if the access decision for the access controller $Action_{AC}$ is not BLOCK or the access decision for the access controller $Action_{AC}$ has not been generated, and if the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ exist and are not NULL, then sending, according to a message type, them to a corresponding IMC in the access controller; and a.5.4) sending the message 5 to the TNC client, the message 5 comprising the PCR index data of the access controller knowable to a trusted platform evaluation layer component $PCRsIndex'_{IMC-AC}$, the platform identity certificate verification result for the access controller $Re_{AIK-AC}$, the integrity measurement parameter for the access controller that is actually measured $Parms_{PC-AC}$, the evaluation policy for the integrity measurement value of the access controller that is actually measured $Evals_{PC-AC}$, the component-level evaluation result for the integrity measurement value of the access controller knowable to a trusted platform evaluation layer component $Res'_{IMV-AC}$, the component-level evaluation result for the integrity measurement value of the access requester $Res_{IMV-AR}$, the component-level remediation information for the integrity measurement value of the access requester $Rems_{IMV-AR}$, the component-level fault information for the integrity measurement value of the access requester $Faults_{IMV-AR}$, the access decision for the access controller $Action_{AC}$, the separate signature 2 $Sig2_{PM}$ and Text5, where if the platform identity certificate of the access requester $Cert_{AIK-AR}$ is invalid, then the parameters related to the evaluation of the integrity measurement value of the access requester are set to be NULL or not exist; and if the platform identity certificate of the access controller $Cert_{AIK-AC}$ is invalid, then the parameters related to the evaluation of the integrity measurement value of the access controller are set to be NULL or not exist; and a.6) upon receipt of the message 5 sent by the TNC access point in the step a.5.4), the TNC client performing the following process:

a.6.1) if the access decision for the access controller $Action_{AC}$ is BLOCK, then instructing the IMC in the access requester that platform remediation is not needed, and generating the access decision for the access requester $Action_{AR}$ and sending the access decision for the access requester $Action_{AR}$ to the network access requester; otherwise, performing step a.6.2);

a.6.2) verifying the validity of the separate signature 2 $Sig2_{PM}$, and if the separate signature 2 $Sig2_{PM}$ is invalid, then discarding the message; if the platform identity certificate verification result for the access controller $Re_{AIK-AC}$ indicates that the platform identity certificate of the access controller $Cert_{AIK-AC}$ is valid, then verifying whether the integrity measurement parameter for the access controller that is actually measured $Parms_{PC-AC}$ and the integrity measurement parameter for the access controller $Parms_{C-AC}$ are the same, and if not the same, then executing another around of the platform authentication protocol by using the difference between the integrity measurement parameter for the access controller that is actually measured $Parms_{PC-AC}$ and the integrity measurement parameter for the access controller $Parms_{C-AC}$, otherwise, generating, according to the component-level evaluation result for the integrity measurement value of the access controller knowable to a trusted platform evaluation layer component $Res'_{IMV-AC}$ in each round of the platform authentication protocol during the platform authentication, the access decision for the access requester $Action_{AR}$, and sending the access decision for the access requester $Action_{AR}$ to the network access requester; if the platform identity certificate verification result for the access controller $Re_{AIK-AC}$ indicates that the platform identity certificate of the access controller $Cert_{AIK-AC}$ is invalid, then generating the access decision for the access requester $Action_{AR}$ and sending the access decision for the access requester $Action_{AR}$ to the network access requester;

a.6.3) if the access decision for the access requester $Action_{AR}$ is not BLOCK or the access decision for the access requester $Action_{AR}$ has not been generated by the TNC client, and if the component-level evaluation result for the integrity measurement value of the access requester $Res_{IMV-AR}$, the component-level remediation information for the integrity measurement value of the access requester $Rems_{IMV-AR}$, and the component-level fault information for the integrity measurement value of the access requester $Faults_{IMV-AR}$ exist and are not NULL, then sending, according to a message type, them to a corresponding IMC in the access requester; if the access decision for the access controller $Action_{AC}$ is not NULL, then instructing the IMC in the access requester the access decision for the access controller $Action_{AC}$; and a.6.4) upon generation of the access decision for the access requester $Action_{AR}$, sending the message 6 to the TNC access point, the message 6 comprising the platform authentication activation challenge from the access controller $N_{AC}$, the access decision for the access requester $Action_{AR}$, and a parameter Text6.

5. The platform authentication method applied in a trusted network connect architecture based on tri-element peer authentication according to claim 1, wherein when the verification of the validity of the platform identity certificate and the evaluation of the integrity measurement value both are performed in a centralized manner, and the signatures are signed in a centralized manner, the step 4) comprises:

b.1) the evaluation policy server verifying the validity of the platform identity certificate of the access requester $Cert_{AIK-AR}$ and generating a platform identity certificate verification result for the access requester $Re_{AIK-AR}$, and verifying the validity of the platform identity certificate of the access controller $Cert_{AIK-AC}$ and generating a platform identity certificate verification result for the access controller $Re_{AIK-AC}$;

b.2) if the platform identity certificate of the access requester $Cert_{AIK-AR}$ is valid, then the evaluation policy server firstly setting, according to the integrity measurement parameter for the access requester that is actually measured $Parms_{PC-AR}$ and the evaluation policy for the integrity measurement value of the access requester that is actually measured $Evals_{PC-AR}$, an IMV in a corresponding policy manager, and sending, the integrity measurement value of the access requester IntegrityInfo$_{IMC-AR}$ to the IMV in the policy manager in which the evaluation policy is set; then, the IMV in the policy manager in which the evaluation policy is set evaluating the integrity measurement value of the access requester IntegrityInfo$_{IMC-AR}$ and returning a component-level evaluation result for the integrity measurement value of the access requester Res$_{IMV-AR}$, component-level remediation information for the integrity measurement value of the access requester Rems$_{IMV-AR}$, and component-level fault information for the integrity measurement value of the access requester Faults$_{IMV-AR}$; and, if the integrity measurement value of the access requester IntegrityInfo$_{IMC-AR}$ is unknowable to a trusted platform evaluation layer component, then the IMV in the policy manager in which the evaluation policy is set also returning the PCR index data of the access requester knowable to a trusted platform evaluation layer component PCRsIndex'$_{IMC-AR}$; and, if the component-level evaluation result for the integrity measurement value of the access requester Res$_{IMV-AR}$ is unknowable to a trusted platform evaluation layer component, then the IMV in the policy manager in which the evaluation policy is set also returning a component-level evaluation result for the integrity measurement value of the access requester knowable to a trusted platform evaluation layer component Res'$_{IMV-AR}$;

b.3) if the platform identity certificate of the access controller Cert$_{AIK-AC}$ is valid, then the evaluation policy server firstly setting, according to the integrity measurement parameter for the access controller that is actually measured Parms$_{PC-AC}$ and the evaluation policy for the integrity measurement value of the access controller that is actually measured Evals$_{PC-AC}$, an IMV in a corresponding policy manager, and sending the integrity measurement value of the access controller IntegrityInfo$_{IMC-AC}$ to the IMV in the policy manager in which the evaluation policy is set; then, the IMV in the policy manager in which the evaluation policy is set evaluating the integrity measurement value of the access controller IntegrityInfo$_{IMC-AC}$ and returning a component-level evaluation result for the integrity measurement value of the access controller Res$_{IMV-AC}$, component-level remediation information for the integrity measurement value of the access controller Rems$_{IMV-AC}$, and component-level fault information for the integrity measurement value of the access controller Faults$_{IMV-AC}$; and, if the integrity measurement value of the access controller IntegrityInfo$_{IMC-AC}$ is unknowable to a trusted platform evaluation layer component, then the IMV in the policy manager in which the evaluation policy is set also returning PCR index data of the access controller knowable to a trusted platform evaluation layer component PCRsIndex'$_{IMC-AC}$; and, if the component-level evaluation result for the integrity measurement value of the access controller Res$_{IMV-AC}$ is unknowable to a trusted platform evaluation layer component, then the IMV in the policy manager in which the evaluation policy is set also returning a component-level evaluation result for the integrity measurement value of the access controller knowable to a trusted platform evaluation layer component Res'$_{IMV-AC}$;

b.4) the evaluation policy server sending the message 4 to the TNC access point, the message 4 comprising the platform identity certificate verification result for the access requester Re$_{AIK-AR}$, the component-level evaluation result for the integrity measurement value of the access requester Res$_{IMV-AR}$, the component-level remediation information for the integrity measurement value of the access requester Rems$_{IMV-AR}$, the component-level evaluation result for the integrity measurement value of the access requester knowable to a trusted platform evaluation layer component Res'$_{IMV-AR}$, the component-level fault information for the integrity measurement value of the access requester Faults$_{IMV-AR}$, the platform identity certificate verification result for the access controller Re$_{AIK-AC}$, the component-level evaluation result for the integrity measurement value of the access controller Res$_{IMV-AC}$, the component-level remediation information for the integrity measurement value of the access controller Rems$_{IMV-AC}$, the component-level evaluation result for the integrity measurement value of the access controller knowable to a trusted platform evaluation layer component Res'$_{IMV-AC}$, the component-level fault information for the integrity measurement value of the access controller Faults$_{IMV-AC}$, a separate signature Sig$_{PM}$, and a parameter Text4, where the separate signature Sig$_{PM}$ is a signature signed by the policy manager by using a private key corresponding to its user certificate on the platform authentication verification challenge from the access controller N$_{AC-PM}$, the platform identity certificate of the access requester Cert$_{AIK-AR}$, the platform identity certificate verification result for the access requester Re$_{AIK-AR}$, the integrity measurement parameter for the access requester that is actually measured Parms$_{PC-AR}$, the evaluation policy for the integrity measurement value of the access requester that is actually measured Evals$_{PC-AR}$, the PCR index data of the access requester knowable to a trusted platform evaluation layer component PCRsIndex'$_{IMC-AR}$, the component-level evaluation result for the integrity measurement value of the access requester knowable to a trusted platform evaluation layer component Res'$_{IMV-AR}$, the platform authentication request challenge from the access requester N$_{AR}$, the platform identity certificate of the access controller Cert$_{AIK-AC}$, the platform identity certificate verification result for the access controller Re$_{AIK-AC}$, the integrity measurement parameter for the access controller that is actually measured Parms$_{PC-AC}$, the evaluation policy for the integrity measurement value of the access controller that is actually measured Evals$_{PC-AC}$, the PCR index data of the access controller knowable to a trusted platform evaluation layer component PCRsIndex'$_{IMC-AC}$, the component-level evaluation result for the integrity measurement value of the access controller knowable to a trusted platform evaluation layer component Res'$_{IMV-AC}$, and a parameter Text7; and if the platform identity certificate of the access requester Cert$_{AIK-AR}$ is invalid, then the parameters related to the evaluation of the integrity measurement value of the access requester are set to be NULL or not exist; and if the platform identity certificate of the access controller Cert$_{AIK-AC}$ is invalid, then the parameters related to the evaluation of the integrity measurement value of the access controller are set to be NULL or not exist;

b.5) upon receipt of the message 4 sent by the evaluation policy server in the step b.4), the TNC access point performing the following process:

b.5.1) verifying the validity of the separate signature Sig$_{PM}$, and if the separate signature Sig$_{PM}$ is invalid, discarding the message;

b.5.2) if the platform identity certificate verification result for the access requester Re$_{AIK-AR}$ indicates that the platform identity certificate of the access requester $Cert_{AIK-AR}$ is valid, then verifying whether the integrity measurement parameter for the access requester that is actually measured $Parms_{PC-AR}$ and the integrity measurement parameter for the access requester $Parms_{C-AR}$ are the same, and if not the same, then executing another around of the platform authentication protocol by using a difference between the integrity measurement parameter for the access requester that is actually measured $Parms_{PC-AR}$ and the integrity measurement parameter for the access requester $Parms_{C-AR}$, otherwise, generating, according to the component-level evaluation result for the integrity measurement value of the access requester knowable to a trusted platform evaluation layer component $Res'_{IMV-AR}$ in each round of the platform authentication protocol during the platform authentication, an access decision for the access controller $Action_{AC}$, and sending the access decision for the access controller $Action_{AC}$ to the network access controller; if the platform identity certificate verification result for the access requester $Re_{AIK-AR}$ indicates that the platform identity certificate of the access requester $Cert_{AIK-AR}$ is invalid, then generating the access decision for the access controller $Action_{AC}$ and sending the access decision for the access controller $Action_{AC}$ to the network access controller;

b.5.3) if the access decision for the access controller $Action_{AC}$ is not BLOCK or the access decision for the access controller $Action_{AC}$ has not been generated, and if the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ exist and are not NULL, then sending, according to a message type, them to a corresponding IMC in the access controller; and b.5.4) sending the message 5 to the TNC client, the message 5 comprising the PCR index data of the access controller knowable to a trusted platform evaluation layer component $PCRsIndex'_{IMC-AC}$, the platform identity certificate verification result for the access controller $Re_{AIK-AC}$, the integrity measurement parameter for the access controller that is actually measured $Parms_{PC-AC}$, the evaluation policy for the integrity measurement value of the access controller that is actually measured $Evals_{PC-AC}$, the component-level evaluation result for the integrity measurement value of the access controller knowable to a trusted platform evaluation layer component $Res'_{IMV-AC}$, the component-level evaluation result for the integrity measurement value of the access requester $Res_{IMV-AR}$, the component-level remediation information for the integrity measurement value of the access requester $Rems_{IMV-AR}$, the component-level fault information for the integrity measurement value of the access requester $Faults_{IMV-AR}$, the access decision for the access controller $Action_{AC}$, the platform authentication verification challenge from the access controller $N_{AC-PM}$, the platform identity certificate verification result for the access requester $Re_{AIK-AR}$, the integrity measurement parameter for the access requester that is actually measured $Parms_{PC-AR}$, the evaluation policy for the integrity measurement value of the access requester that is actually measured $Evals_{PC-AR}$, the component-level evaluation result for the integrity measurement value of the access requester knowable to a trusted platform evaluation layer component $Res'_{IMV-AR}$, the separate signature $Sig_{PM}$ and Text5, where if the platform identity certificate of the access requester $Cert_{AIK-AR}$ is invalid, then the parameters related to the evaluation of the integrity measurement value of the access requester are set to be NULL or not exist; and if platform identity certificate of the access controller $Cert_{AIK-AC}$ is invalid, then the parameters related to the evaluation of the integrity measurement value of the access controller are set to be NULL or not exist; and b.6) upon receipt of the message 5 sent by the TNC access point in the step b.5.4), the TNC client performing the following process:

b.6.1) if the access decision for the access controller $Action_{AC}$ is BLOCK, then instructing the IMC in the access requester that platform remediation is not needed, and generating the access decision for the access requester $Action_{AR}$ and sending the access decision for the access requester $Action_{AR}$ to the network access requester; otherwise, performing step b.6.2);

b.6.2) verifying the validity of the separate signature $Sig_{PM}$, and if the separate signature $Sig_{PM}$ is invalid, then discarding the message; if the platform identity certificate verification result for the access controller $Re_{AIK-AC}$ indicates that the platform identity certificate of the access controller $Cert_{AIK-AC}$ is valid, then verifying whether the integrity measurement parameter for the access controller that is actually measured $Parms_{PC-AC}$ and the integrity measurement parameter for the access controller $Parms_{C-AC}$ are the same, and if not the same, then executing another around of the platform authentication protocol by using the difference between the integrity measurement parameter for the access controller that is actually measured $Parms_{PC-AC}$ and the integrity measurement parameter for the access controller $Parms_{C-AC}$, otherwise, generating, according to the component-level evaluation result for the integrity measurement value of the access controller knowable to a trusted platform evaluation layer component $Res'_{IMV-AC}$ in each round of the platform authentication protocol during the platform authentication, the access decision for the access requester $Action_{AR}$, and sending the access decision for the access requester $Action_{AR}$ to the network access requester; if the platform identity certificate verification result for the access controller $Re_{AIK-AC}$ indicates that the platform identity certificate of the access controller $Cert_{AIK-AC}$ is invalid, then generating the access decision for the access requester $Action_{AR}$ and sending the access decision for the access requester $Action_{AR}$ to the network access requester;

b.6.3) if the access decision for the access requester $Action_{AR}$ is not BLOCK or the access decision for the access requester $Action_{AR}$ has not been generated by the TNC client, and if the component-level evaluation result for the integrity measurement value of the access requester $Res_{IMV-AR}$, the component-level remediation information for the integrity measurement value of the access requester $Rems_{IMV-AR}$, and the component-level fault information for the integrity measurement value of the access requester $Faults_{IMV-AR}$ exist and are not NULL, then sending, according to a message type, them to a corresponding IMC in the access requester; if the access decision for the access controller Action$_{AC}$ is not NULL, then instructing the IMC in the access requester the access decision for the access controller Action$_{AC}$; and b.6.4) upon generation of the access decision for the access requester Action$_{AR}$, sending the message 6 to the TNC access point, the message 6 comprising the platform authentication activation challenge from the access controller N$_{AC}$, the access decision of the access requester Action$_{AR}$, and a parameter Text6.

6. The platform authentication method applied in a trusted network connect architecture based on tri-element peer authentication according to claim 1, wherein when the verification of the validity of the platform identity certificate and the evaluation of the integrity measurement value both are performed in a separate manner, and the signatures in both a platform identity certificate validity verification part and an integrity measurement value evaluation part are signed in a separate manner, the step 4) comprises:

c.1) the evaluation policy server verifying the validity of the platform identity certificate of the access requester Cert$_{AIK-AR}$ and generating a platform identity certificate verification result for the access requester Re$_{AIK-AR}$, and verifying the validity of the platform identity certificate of the access controller Cert$_{AIK-AC}$ and generating a platform identity certificate verification result for the access controller Re$_{AIK-AC}$;

c.2) constructing the platform identity certificate validity verification part of the message 4, which comprises the platform identity certificate verification result for the access requester Re$_{AIK-AR}$, the platform identity certificate verification result for the access controller Re$_{AIK-AC}$, a certificate validity verification separate signature 1 Sig1$_{PM-AIK}$, and a certificate validity verification separate signature 2 Sig2$_{PM-AIK}$, where the certificate validity verification separate signature 1 Sig1$_{PM-AIK}$ is a signature signed by using a private key corresponding to a user certificate on the platform authentication verification challenge from the access controller N$_{AC-PM}$, the platform identity certificate of the access requester Cert$_{AIK-AR}$, the platform identity certificate verification result for the access requester Re$_{AIK-AR}$, and a Text7, and the certificate validity verification separate signature 2 Sig2$_{PM-AIK}$ is a signature signed by using a private key corresponding to the user certificate on the platform authentication request challenge from the access requester N$_{AR}$, the platform identity certificate of the access controller Cert$_{AIK-AC}$, the platform identity certificate verification result for the access controller Re$_{AIK-AC}$, and a Text8;

c.3) if the platform identity certificate of the access requester Cert$_{AIK-AR}$ is valid, then the evaluation policy server firstly setting, according to the integrity measurement parameter for the access requester that is actually measured Parms$_{PC-AR}$ and the evaluation policy for the integrity measurement value of the access requester that is actually measured Evals$_{PC-AR}$, an IMV in a corresponding policy manager, and sending the integrity measurement value of the access requester Integrity Info$_{IMC-AR}$ to the IMV in the policy manager in which the evaluation policy is set; then, the IMV in the policy manager in which the evaluation policy is set evaluating the integrity measurement value of the access requester IntegrityInfo$_{IMC-AR}$ and returning a component-level evaluation result for the integrity measurement value of the access requester Res$_{IMV-AR}$, component-level remediation information for the integrity measurement value of the access requester Rems$_{IMV-AR}$, and component-level fault information for the integrity measurement value of the access requester Faults$_{IMV-AR}$; and, if the integrity measurement value of the access requester IntegrityInfo$_{IMC-AR}$ is unknowable to a trusted platform evaluation layer component, then the IMV in the policy manager in which the evaluation policy is set also returning the PCR index data of the access requester knowable to a trusted platform evaluation layer component PCRsIndex'$_{IMC-AR}$; and, if the component-level evaluation result for the integrity measurement value of the access requester Res$_{IMV-AR}$ is unknowable to a trusted platform evaluation layer component, then the IMV in the policy manager in which the evaluation policy is set also returning a component-level evaluation result for the integrity measurement value of the access requester knowable to a trusted platform evaluation layer component Res'$_{IMV-AR}$;

c.4) if the platform identity certificate of the access controller Cert$_{AIK-AC}$ is valid, then the evaluation policy server firstly setting, according to the integrity measurement parameter for the access controller that is actually measured Parms$_{PC-AC}$ and the evaluation policy for the integrity measurement value of the access controller that is actually measured Evals$_{PC-AC}$, an IMV in a corresponding policy manager, and sending the integrity measurement value of the access controller Integrity Info$_{IMC-AC}$ to the IMV in the policy manager in which the evaluation policy is set; then, the IMV in the policy manager in which the evaluation policy is set evaluating the integrity measurement value of the access controller IntegrityInfo$_{IMC-AC}$ and returning a component-level evaluation result for the integrity measurement value of the access controller Res$_{IMV-AC}$, component-level remediation information for the integrity measurement value of the access controller Rems$_{IMV-AC}$, and component-level fault information for the integrity measurement value of the access controller Faults$_{IMV-AC}$; and, if the integrity measurement value of the access controller IntegrityInfo$_{IMC-AC}$ is unknowable to a trusted platform evaluation layer component, then the IMV in the policy manager in which the evaluation policy is set also returning PCR index data of the access controller knowable to a trusted platform evaluation layer component PCRsIndex'$_{IMC-AC}$; and, if the component-level evaluation result for the integrity measurement value of the access controller Res$_{IMV-AC}$ is unknowable to a trusted platform evaluation layer component, then the IMV in the policy manager in which the evaluation policy is set also returning a component-level evaluation result for the integrity measurement value of the access controller knowable to a trusted platform evaluation layer component Res'$_{IMV-AC}$;

c.5) constructing the integrity measurement value evaluation part of the message 4, which comprises the component-level evaluation result for the integrity measurement value of the access requester Res$_{IMV-AIR}$, the component-level remediation information for the integrity measurement value of the access requester Rems$_{IMV-AR}$, the component-level evaluation result for the integrity measurement value of the access requester knowable to a trusted platform evaluation layer component Res'$_{IMV-AR}$, the component-level fault information for the integrity measurement value of the access requester Faults$_{IMV-AR}$, the component-level evaluation result for the integrity measurement value of the access controller Res$_{IMV-AC}$, the component-level remediation information for the integrity measurement value of the access controller Rems$_{IMV-AC}$, the component-level evaluation result for the integrity measurement value of the access controller knowable to a trusted platform evaluation layer component Res'$_{IMV-AC}$, the component-level fault information for the integrity measurement value of the access controller Faults$_{IMV-AC}$, an integrity measurement value evaluation separate signature 1 Sig1$_{PM-IM}$, and an integrity measurement value evaluation separate signature 2 Sig2$_{PM-IM}$, where the integrity measurement value evaluation separate signature 1 Sig1$_{PM-IM}$ is a signature signed by the policy manager by using a private key corresponding to its user certificate on the platform authentication verification challenge from the access controller N$_{AC-PM}$, the integrity measurement parameter for the access requester that is actually measured Parms$_{PC-AR}$, the evaluation policy for the integrity measurement value of the access requester that is actually measured Evals$_{PC-AR}$, the PCR index data of the access requester knowable to a trusted platform evaluation layer component PCRsIndex'$_{IMC-AR}$, the component-level evaluation result for the integrity measurement value of the access requester knowable to a trusted platform evaluation layer component Res'$_{IMV-AR}$, the component-level evaluation result for the integrity measurement value of the access controller Res$_{IMV-AC}$, the component-level remediation information for the integrity measurement value of the access controller Rems$_{IMV-AC}$, the component-level fault information for the integrity measurement value of the access controller Faults$_{IMV-AC}$, and a parameter Text9, and the integrity measurement value evaluation separate signature 2 Sig2$_{PM-IM}$ is a signature signed by the policy manager by using a private key corresponding to its user certificate on the platform authentication request challenge from the access requester N$_{AR}$, the integrity measurement parameter for the access controller that is actually measured Parms$_{PC-AC}$, the evaluation policy for the integrity measurement value of the access controller that is actually measured Evals$_{PC-AC}$, the PCR index data of the access controller knowable to a trusted platform evaluation layer component PCRsIndex'$_{IMC-AC}$, the component-level evaluation result for the integrity measurement value of the access controller knowable to a trusted platform evaluation layer component Res'$_{IMV-AC}$, the component-level evaluation result for the integrity measurement value of the access requester Res$_{IMV-AR}$, the component-level remediation information for the integrity measurement value of the access requester Rems$_{IMV-AR}$, the component-level fault information for the integrity measurement value of the access requester Faults$_{IMV-AR}$, and a parameter Text10; and if the platform identity certificate of the access requester Cert$_{AIK-AR}$ is invalid, then the parameters related to the evaluation of the integrity measurement value of the access requester are set to be NULL or not exist; and if the platform identity certificate of the access controller Cert$_{AIK-AC}$ is invalid, then the parameters related to the evaluation of the integrity measurement value of the access controller are set to be NULL or not exist;

c.6) the evaluation policy server sending the message 4 to the TNC access point, the message 4 comprising the platform identity certificate validity verification part of the message 4, the integrity measurement value evaluation part of the message 4, and a parameter Text4;

c.7) upon receipt of the message 4 sent by the evaluation policy server in the step c.6), the TNC access point performing the following process:

c.7.1) verifying the validity of the certificate validity verification separate signature 1 Sig1$_{PM-AIK}$ and the validity of the integrity measurement value evaluation separate signature 1 Sig1$_{PM-IM}$, and if invalid, discarding the message;

c.7.2) if the platform identity certificate verification result for the access requester Re$_{AIK-AR}$ indicates that the platform identity certificate of the access requester Cert$_{AIK-AR}$ is valid, then verifying whether the integrity measurement parameter for the access requester that is actually measured Parms$_{PC-AR}$ and the integrity measurement parameter for the access requester Parms$_{C-AR}$ are the same, and if not the same, then executing another around of the platform authentication protocol by using a difference between the integrity measurement parameter for the access requester that is actually measured Parms$_{PC-AR}$ and the integrity measurement parameter for the access requester Parms$_{C-AR}$, otherwise, generating, according to the component-level evaluation result for the integrity measurement value of the access requester knowable to a trusted platform evaluation layer component Res'$_{IMV-AR}$ in each round of the platform authentication protocol during the platform authentication, an access decision for the access controller Action$_{AC}$, and sending the access decision for the access controller Action$_{AC}$ to the network access controller; if the platform identity certificate verification result for the access requester Re$_{AIK-AR}$ indicates that the platform identity certificate of the access requester Cert$_{AIK-AR}$ is invalid, then generating the access decision for the access controller Action$_{AC}$ and sending the access decision for the access controller Action$_{AC}$ to the network access controller;

c.7.3) if the access decision for the access controller Action$_{AC}$ is not BLOCK or the access decision for the access controller Action$_{AC}$ has not been generated, and if the component-level evaluation result for the integrity measurement value of the access controller Res$_{IMV-AC}$, the component-level remediation information for the integrity measurement value of the access controller Rems$_{IMV-AC}$, and the component-level fault information for the integrity measurement value of the access controller Faults$_{IMV-AC}$ exist and are not NULL, then sending, according to a message type, them to a corresponding IMC in the access controller; and c.7.4) sending the message 5 to the TNC client, the message 5 comprising the PCR index data of the access controller knowable to a trusted platform evaluation layer component PCRsIndex'$_{IMC-AC}$, the platform identity certificate verification result for the access controller Re$_{AIK-AC}$, the integrity measurement parameter for the access controller that is actually measured Parms$_{PC-AC}$, the evaluation policy for the integrity measurement value of the access controller that is actually measured Evals$_{PC-AC}$, the component-level evaluation result for the integrity measurement value of the access controller knowable to a trusted platform evaluation layer component Res'$_{IMV-AC}$, the component-level evaluation result for the integrity measurement value of the access requester Res$_{IMV-AR}$, the component-level remediation information for the integrity measurement value of the access requester Rems$_{IMV-AR}$, the component-level fault information for the integrity measurement value of the access requester Faults$_{IMV-AR}$, the access decision for the access controller Action$_{AC}$, a certificate validity verification separate signature 2 Sig2$_{PM-AIK}$, the integrity measurement value evaluation separate signature 2 Sig2$_{PM-IM}$, and Text5, where if the platform identity certificate of the access requester Cert$_{AIK-AR}$ is invalid, then the parameters related to the evaluation of the integrity measurement value of the access requester are set to be NULL or not exist; and if platform identity certificate of the access controller Cert$_{AIK-AC}$ is invalid, then the parameters related to the evaluation of the integrity measurement value of the access controller are set to be NULL or not exist; and c.8) upon receipt of the message 5 sent by the TNC access point in the step c.7.4), the TNC client performing the following process:

c.8.1) if the access decision for the access controller Action$_{AC}$ is BLOCK, then instructing the IMC in the access requester that platform remediation is not needed, and generating the access decision for the access requester Action$_{AR}$ and sending the access decision for the access requester Action$_{AR}$ to the network access requester; otherwise, performing step c.8.2);

c.8.2) verifying the validity of the certificate validity verification separate signature 2 Sig2$_{PM-AIK}$ and the validity of the integrity measurement value evaluation separate signature 2 Sig2$_{PM-IM}$, and if invalid, then discarding the message; if the platform identity certificate verification result for the access controller Re$_{AIK-AC}$ indicates that the platform identity certificate of the access controller Cert$_{AIK-AC}$ is valid, then verifying whether the integrity measurement parameter for the access controller that is actually measured Parms$_{PC-AC}$ and the integrity measurement parameter for the access controller Parms$_{C-AC}$ are the same, and if not the same, then executing another around of the platform authentication protocol by using the difference between the integrity measurement parameter for the access controller that is actually measured Parms$_{PC-AC}$ and the integrity measurement parameter for the access controller Parms$_{C-AC}$, otherwise, generating, according to the component-level evaluation result for the integrity measurement value of the access controller knowable to a trusted platform evaluation layer component Res'$_{IMV-AC}$ in each round of the platform authentication protocol during the platform authentication, the access decision for the access requester Action$_{AR}$, and sending the access decision for the access requester Action$_{AR}$ to the network access requester; if the platform identity certificate verification result for the access controller Re$_{AIK-AC}$ indicates that the platform identity certificate of the access controller Cert$_{AIK-AC}$ is invalid, then generating the access decision for the access requester Action$_{AR}$ and sending the access decision for the access requester Action$_{AR}$ to the network access requester;

c.8.3) if the access decision for the access requester Action$_{AR}$ is not BLOCK or the access decision for the access requester Action$_{AR}$ has not been generated by the TNC client, and if the component-level evaluation result for the integrity measurement value of the access requester Res$_{IMV-AR}$, the component-level remediation information for the integrity measurement value of the access requester Rems$_{IMV-AR}$, and the component-level fault information for the integrity measurement value of the access requester Faults$_{IMV-AR}$ exist and are not NULL, then sending, according to a message type, them to a corresponding IMC in the access requester; if the access decision for the access controller Action$_{AC}$ is not NULL, then instructing the IMC in the access requester the access decision for the access controller Action$_{AC}$; and c.8.4) upon generation of the access decision for the access requester Action$_{AR}$, sending the message 6 to the TNC access point, the message 6 comprising the platform authentication activation challenge from the access controller N$_{AC}$, the access decision of the access requester Action$_{AR}$, and a parameter Text6.

7. The platform authentication method applied in a trusted network connect architecture based on tri-element peer authentication according to claim 1, wherein when the verification of the validity of the platform identity certificate and the evaluation of the integrity measurement value both are performed in a separate manner, and the signatures in both a platform identity certificate validity verification part and an integrity measurement value evaluation part are signed in a centralized manner, the step 4) comprises:

d.1) the evaluation policy server verifying the validity of the platform identity certificate of the access requester Cert$_{AIK-AR}$ and generating a platform identity certificate verification result for the access requester Re$_{AIK-AR}$, and verifying the validity of the platform identity certificate of the access controller Cert$_{AIK-AC}$ and generating a platform identity certificate verification result for the access controller Re$_{AIK-AC}$;

d.2) constructing the platform identity certificate validity verification part of the message 4, which comprises the platform identity certificate verification result for the access requester Re$_{AIK-AR}$, the platform identity certificate verification result for the access controller Re$_{AIK-AC}$, and a certificate validity verification separate signature Sig$_{PM-AIK}$, where the certificate validity verification separate signature Sig$_{PM-AIK}$ is a signature signed by using a private key corresponding to a user certificate on the platform authentication verification challenge from the access controller N$_{AC-PM}$, the platform identity certificate of the access requester Cert$_{AIK-AR}$, the platform identity certificate verification result for the access requester Re$_{AIK-AR}$, the platform authentication request challenge from the access requester N$_{AR}$, the platform identity certificate of the access controller Cert$_{AIK-AC}$, the platform identity certificate verification result for the access controller Re$_{AIK-AC}$, and a Text7;

d.3) if the platform identity certificate of the access requester Cert$_{AIK-AR}$ is valid, then the evaluation policy server firstly setting, according to the integrity measurement parameter for the access requester that is actually measured Parms$_{PC-AR}$ and the evaluation policy for the integrity measurement value of the access requester that is actually measured Evals$_{PC-AR}$, an IMV in a corresponding policy manager, and sending the integrity measurement value of the access requester IntegrityInfo$_{IMC-AR}$ to the IMV in the policy manager in which the evaluation policy is set; then, the IMV in the policy manager in which the evaluation policy is set evaluating the integrity measurement value of the access requester IntegrityInfo$_{IMC-AR}$ and returning a component-level evaluation result for the integrity measurement value of the access requester Res$_{IMV-AR}$, component-level remediation information for the integrity measurement value of the access requester Rems$_{IMV-AR}$, and component-level fault information for the integrity measurement value of the access requester Faults$_{IMV-AR}$; and, if the integrity measurement value of the access requester IntegrityInfo$_{IMC-AR}$ is unknowable to a trusted platform evaluation layer component, then the IMV in the policy manager in which the evaluation policy is set also returning the PCR index data of the access requester knowable to a trusted platform evaluation layer component PCRsIndex'$_{IMC-AR}$; and, if the component-level evaluation result for the integrity measurement value of the access requester Res$_{IMV-AR}$ is unknowable to a trusted platform evaluation layer component, then the IMV in the policy manager in which the evaluation policy is set also returning a component-level evaluation result for the integrity measurement value of the access requester knowable to a trusted platform evaluation layer component Res'$_{IMV-AR}$;

d.4) if the platform identity certificate of the access controller Cert$_{AIK-AC}$ is valid, then the evaluation policy server firstly setting, according to the integrity measurement parameter for the access controller that is actually measured Parms$_{PC-AC}$ and the evaluation policy for the integrity measurement value of the access controller that is actually measured Evals$_{PC-AC}$, an IMV in a corresponding policy manager, and sending the integrity measurement value of the access controller Integrity Info$_{IMC-AC}$ to the IMV in the policy manager in which the evaluation policy is set; then, the IMV in the policy manager in which the evaluation policy is set evaluating the integrity measurement value of the access controller IntegrityInfo$_{IMC-AC}$ and returning a component-level evaluation result for the integrity measurement value of the access controller Res$_{IMV-AC}$, component-level remediation information for the integrity measurement value of the access controller Rems$_{IMV-AC}$, and component-level fault information for the integrity measurement value of the access controller Faults$_{IMV-AC}$; and, if the integrity measurement value of the access controller IntegrityInfo$_{IMC-AC}$ is unknowable to a trusted platform evaluation layer component, then the IMV in the policy manager in which the evaluation policy is set also returning PCR index data of the access controller knowable to a trusted platform evaluation layer component PCRsIndex'$_{IMC-AC}$; and, if the component-level evaluation result for the integrity measurement value of the access controller Res$_{IMV-AC}$ is unknowable to a trusted platform evaluation layer component, then the IMV in the policy manager in which the evaluation policy is set also returning n a component-level evaluation result for the integrity measurement value of the access controller knowable to a trusted platform evaluation layer component Res'$_{IMV-AC}$;

d.5) constructing the integrity measurement value evaluation part of the message 4, which comprises the component-level evaluation result for the integrity measurement value of the access requester Res$_{IMV-AR}$, the component-level remediation information for the integrity measurement value of the access requester Rems$_{IMV-AR}$, the component-level evaluation result for the integrity measurement value of the access requester knowable to a trusted platform evaluation layer component Res'$_{IMV-AR}$, the component-level fault information for the integrity measurement value of the access requester Faults$_{IMV-AR}$, the component-level evaluation result for the integrity measurement value of the access controller Res$_{IMV-AC}$, the component-level remediation information for the integrity measurement value of the access controller Rems$_{IMV-AC}$, the component-level evaluation result for the integrity measurement value of the access controller knowable to a trusted platform evaluation layer component Res'$_{IMV-AC}$, the component-level fault information for the integrity measurement value of the access controller Faults$_{IMV-AC}$, and an integrity measurement value evaluation separate signature Sig$_{PM-IM}$, where the integrity measurement value evaluation separate signature Sig$_{PM-IM}$ is a signature signed by the policy manager by using a private key corresponding to its user certificate on the platform authentication verification challenge from the access controller N$_{AC-PM}$, the integrity measurement parameter for the access requester that is actually measured Parms$_{PC-AR}$, the evaluation policy for the integrity measurement value of the access requester that is actually measured Evals$_{PC-AR}$, the PCR index data of the access requester knowable to a trusted platform evaluation layer component PCRsIndex'$_{IMC-AR}$, the component-level evaluation result for the integrity measurement value of the access requester knowable to a trusted platform evaluation layer component Res'$_{IMV-AR}$, the platform authentication request challenge from the access requester N$_{AR}$, the integrity measurement parameter for the access controller that is actually measured Parms$_{PC-AC}$, the evaluation policy for the integrity measurement value of the access controller that is actually measured Evals$_{PC-AC}$, the PCR index data of the access controller knowable to a trusted platform evaluation layer component PCRs Index'$_{IMC-AC}$, the component-level evaluation result for the integrity measurement value of the access controller knowable to a trusted platform evaluation layer component Res'$_{IMV-AC}$, the component-level evaluation result for the integrity measurement value of the access requester Res$_{IMV-AR}$, the component-level remediation information for the integrity measurement value of the access requester Rems$_{IMV-AR}$, the component-level fault information for the integrity measurement value of the access requester Faults$_{IMV-AR}$, the component-level evaluation result for the integrity measurement value of the access controller Res$_{IMV-AC}$, the component-level remediation information for the integrity measurement value of the access controller Rems$_{IMV-AC}$, the component-level fault information for the integrity measurement value of the access controller Faults$_{IMV-AC}$, and a parameter Text9; and if the platform identity certificate of the access requester Cert$_{AIK-AR}$ is invalid, then the parameters related to the evaluation of the integrity measurement value of the access requester are set to be NULL or not exist; and if the platform identity certificate of the access controller Cert$_{AIK-AC}$ is invalid, then the parameters related to the evaluation of the integrity measurement value of the access controller are set to be NULL or not exist;

d.6) the evaluation policy server sending the message 4 to the TNC access point, the message 4 comprising the platform identity certificate validity verification part of the message 4, the integrity measurement value evaluation part of the message 4, and a parameter Text4;

d.7) upon receipt of the message 4 sent by the evaluation policy server in the step d.6), the TNC access point performing the following process:

d.7.1) verifying the validity of the certificate validity verification separate signature Sig$_{PM-AIK}$ and the validity of the integrity measurement value evaluation separate signature $\text{Sig}_{PM-IM}$, and if invalid, discarding the message;

d.7.2) if the platform identity certificate verification result for the access requester $\text{Re}_{AIK-AR}$ indicates that the platform identity certificate of the access requester $\text{Cert}_{AIK-AR}$ is valid, then verifying whether the integrity measurement parameter for the access requester that is actually measured $\text{Parms}_{PC-AR}$ and the integrity measurement parameter for the access requester $\text{Parms}_{C-AR}$ are the same, and if not the same, then executing another around of the platform authentication protocol by using a difference between the integrity measurement parameter for the access requester that is actually measured $\text{Parms}_{PC-AR}$ and the integrity measurement parameter for the access requester $\text{Parms}_{C-AR}$, otherwise, generating, according to the component-level evaluation result for the integrity measurement value of the access requester knowable to a trusted platform evaluation layer component $\text{Res'}_{IMV-AR}$ in each round of the platform authentication protocol during the platform authentication, an access decision for the access controller $\text{Action}_{AC}$, and sending the access decision for the access controller $\text{Action}_{AC}$ to the network access controller; if the platform identity certificate verification result for the access requester $\text{Re}_{AIK-AR}$ indicates that the platform identity certificate of the access requester $\text{Cert}_{AIK-AR}$ is invalid, then generating the access decision for the access controller $\text{Action}_{AC}$ and sending the access decision for the access controller $\text{Action}_{AC}$ to the network access controller;

d.7.3) if the access decision for the access controller $\text{Action}_{AC}$ is not BLOCK or the access decision for the access controller $\text{Action}_{AC}$ has not been generated, and if the component-level evaluation result for the integrity measurement value of the access controller $\text{Res}_{IMV-AC}$, the component-level remediation information for the integrity measurement value of the access controller $\text{Rems}_{IMV-AC}$, and the component-level fault information for the integrity measurement value of the access controller $\text{Faults}_{IMV-AC}$ exist and are not NULL, then sending, according to a message type, them to a corresponding IMC in the access controller; and d.7.4) sending the message 5 to the TNC client, the message 5 comprising the PCR index data of the access controller knowable to a trusted platform evaluation layer component $\text{PCRsIndex'}_{IMC-AC}$, the platform identity certificate verification result for the access controller $\text{Re}_{AIK-AC}$, the integrity measurement parameter for the access controller that is actually measured $\text{Parms}_{PC-AC}$, the evaluation policy for the integrity measurement value of the access controller that is actually measured $\text{Evals}_{PC-AC}$, the component-level evaluation result for the integrity measurement value of the access controller knowable to a trusted platform evaluation layer component $\text{Res'}_{IMV-AC}$, the component-level evaluation result for the integrity measurement value of the access requester $\text{Res}_{IMV-AR}$, the component-level remediation information for the integrity measurement value of the access requester $\text{Rems}_{IMV-AR}$, the component-level fault information for the integrity measurement value of the access requester $\text{Faults}_{IMV-AR}$, the access decision for the access controller $\text{Action}_{AC}$, the platform authentication verification challenge from the access controller $N_{AC-PM}$, the platform identity certificate verification result for the access requester $\text{Re}_{AIK-AR}$, the integrity measurement parameter for the access requester that is actually measured $\text{Parms}_{PC-AR}$, the evaluation policy for the integrity measurement value of the access requester that is actually measured $\text{Evals}_{PC-AR}$, the component-level evaluation result for the integrity measurement value of the access requester knowable to a trusted platform evaluation layer component $\text{Res'}_{IMV-AR}$, the certificate validity verification separate signature $\text{Sig}_{PM-AIK}$, the integrity measurement value evaluation separate signature $\text{Sig}_{PM-IM}$, and Text5, where if the platform identity certificate of the access requester $\text{Cert}_{AIK-AR}$ is invalid, then the parameters related to the evaluation of the integrity measurement value of the access requester are set to be NULL or not exist; and if platform identity certificate of the access controller $\text{Cert}_{AIK-AC}$ is invalid, then the parameters related to the evaluation of the integrity measurement value of the access controller are set to be NULL or not exist; and d.8) upon receipt of the message 5 sent by the TNC access point in the step d.7.4), the TNC client performing the following process:

d.8.1) if the access decision for the access controller $\text{Action}_{AC}$ is BLOCK, then instructing, the IMC in the access requester that platform remediation is not needed, and generating the access decision for the access requester $\text{Action}_{AR}$ and sending the access decision for the access requester $\text{Action}_{AR}$ to the network access requester; otherwise, performing step d.8.2);

d.8.2) verifying the validity of the certificate validity verification separate signature $\text{Sig}_{PM-AIK}$ and the validity of the integrity measurement value evaluation separate signature $\text{Sig}_{PM-IM}$, and if invalid, then discarding the message; if the platform identity certificate verification result for the access controller $\text{Re}_{AIK-AC}$ indicates that the platform identity certificate of the access controller $\text{Cert}_{AIK-AC}$ is valid, then verifying whether the integrity measurement parameter for the access controller that is actually measured $\text{Parms}_{PC-AC}$ and the integrity measurement parameter for the access controller $\text{Parms}_{C-AC}$ are the same, and if not the same, then executing another around of the platform authentication protocol by using the difference between the integrity measurement parameter for the access controller that is actually measured $\text{Parms}_{PC-AC}$ and the integrity measurement parameter for the access controller $\text{Parms}_{C-AC}$, otherwise, generating, according to the component-level evaluation result for the integrity measurement value of the access controller knowable to a trusted platform evaluation layer component $\text{Res'}_{IMV-AC}$ in each round of the platform authentication protocol during the platform authentication, the access decision for the access requester $\text{Action}_{AR}$, and sending the access decision for the access requester $\text{Action}_{AR}$ to the network access requester; if the platform identity certificate verification result for the access controller $\text{Re}_{AIK-AC}$ indicates that the platform identity certificate of the access controller $\text{Cert}_{AIK-AC}$ is invalid, then generating the access decision for the access requester $\text{Action}_{AR}$ and sending the access decision for the access requester $\text{Action}_{AR}$ to the network access requester;

d.8.3) if the access decision for the access requester $\text{Action}_{AR}$ is not BLOCK or the access decision for the access requester Action$_{AR}$ has not been generated by the TNC client, and if the component-level evaluation result for the integrity measurement value of the access requester Res$_{IMV-AR}$, the component-level remediation information for the integrity measurement value of the access requester Rems$_{IMV-AR}$, and the component-level fault information for the integrity measurement value of the access requester Faults$_{IMV-AR}$ exist and are not NULL, then sending, according to a message type, them to a corresponding IMC in the access requester; if the access decision for the access controller Action$_{AC}$ is not NULL, then instructing the IMC in the access requester the access decision for the access controller Action$_{AC}$; and d.8.4) upon generation of the access decision for the access requester Action$_{AR}$, sending the message 6 to the TNC access point, the message 6 comprising the platform authentication activation challenge from the access controller N$_{AC}$, the access decision of the access requester Action$_{AR}$, and a parameter Text6.

8. The platform authentication method applied in a trusted network connect architecture based on tri-element peer authentication according to claim 1, wherein when the verification of the validity of the platform identity certificate and the evaluation of the integrity measurement value both are performed in a separate manner, the signatures in a platform identity certificate validity verification part are signed in a separate manner, and the signatures in an integrity measurement value evaluation part are signed in a centralized manner, the step 4) comprises:

e.1) the evaluation policy server verifying the validity of the platform identity certificate of the access requester Cert$_{AIK-AR}$ and generating a platform identity certificate verification result for the access requester Re$_{AIK-AR}$, and verifying the validity of the platform identity certificate of the access controller Cert$_{AIK-AC}$ and generating a platform identity certificate verification result for the access controller Re$_{AIK-AC}$;

e.2) constructing the platform identity certificate validity verification part of the message 4, which comprises the platform identity certificate verification result for the access requester Re$_{AIK-AR}$, the platform identity certificate verification result for the access controller Re$_{AIK-AC}$, a certificate validity verification separate signature 1 Sig1$_{PM-AIK}$, and a certificate validity verification separate signature 2 Sig2$_{PM-AIK}$, where the certificate validity verification separate signature 1 Sig1$_{PM-AIK}$ is a signature signed by using a private key corresponding to a user certificate on the platform authentication verification challenge from the access controller N$_{AC-PM}$, the platform identity certificate of the access requester Cert$_{AIK-AR}$, the platform identity certificate verification result for the access requester Re$_{AIK-AR}$, and a Text7, and the certificate validity verification separate signature 2 Sig2$_{PM-AIK}$ is a signature signed by using a private key corresponding to the user certificate on the platform authentication request challenge from the access requester N$_{AR}$, the platform identity certificate of the access controller Cert$_{AIK-AC}$, the platform identity certificate verification result for the access controller Re$_{AIK-AC}$, and a Text8;

e.3) if the platform identity certificate of the access requester Cert$_{AIK-AR}$ is valid, then the evaluation policy server firstly setting, according to the integrity measurement parameter for the access requester that is actually measured Parms$_{PC-AR}$ and the evaluation policy for the integrity measurement value of the access requester that is actually measured Evals$_{PC-AR}$, an IMV in a corresponding policy manager, and sending the integrity measurement value of the access requester IntegrityInfo$_{IMC-AR}$ to the IMV in the policy manager in which the evaluation policy is set; then, the IMV in the policy manager in which the evaluation policy is set evaluating the integrity measurement value of the access requester IntegrityInfo$_{IMC-AR}$ and returning a component-level evaluation result for the integrity measurement value of the access requester Res$_{IMV-AR}$, component-level remediation information for the integrity measurement value of the access requester Rems$_{IMV-AR}$, and component-level fault information for the integrity measurement value of the access requester Faults$_{IMV-AR}$; and, if the integrity measurement value of the access requester IntegrityInfo$_{IMC-AR}$ is unknowable to a trusted platform evaluation layer component, then the IMV in the policy manager in which the evaluation policy is set also returning the PCR index data of the access requester knowable to a trusted platform evaluation layer component PCRsIndex'$_{IMC-AR}$; and, if the component-level evaluation result for the integrity measurement value of the access requester Res$_{IMV-AR}$ is unknowable to a trusted platform evaluation layer component, then the IMV in the policy manager in which the evaluation policy is set also returning a component-level evaluation result for the integrity measurement value of the access requester knowable to a trusted platform evaluation layer component Res'$_{IMV-AR}$;

e.4) if the platform identity certificate of the access controller Cert$_{AIK-AC}$ is valid, then the evaluation policy server firstly setting, according to the integrity measurement parameter for the access controller that is actually measured Parms$_{PC-AC}$ and the evaluation policy for the integrity measurement value of the access controller that is actually measured Evals$_{PC-AC}$, an IMV in a corresponding policy manager, and sending the integrity measurement value of the access controller IntegrityInfo$_{IMC-AC}$ to the IMV in the policy manager in which the evaluation policy is set; then, the IMV in the policy manager in which the evaluation policy is set evaluating the integrity measurement value of the access controller IntegrityInfo$_{IMC-AC}$ and returning a component-level evaluation result for the integrity measurement value of the access controller Res$_{IMV-AC}$, component-level remediation information for the integrity measurement value of the access controller Rems$_{IMV-AC}$, and component-level fault information for the integrity measurement value of the access controller Faults$_{IMV-AC}$; and, if the integrity measurement value of the access controller IntegrityInfo$_{IMC-AC}$ is unknowable to a trusted platform evaluation layer component, then the IMV in the policy manager in which the evaluation policy is set also returning PCR index data of the access controller knowable to a trusted platform evaluation layer component PCRsIndex'$_{IMC-AC}$; and, if the component-level evaluation result for the integrity measurement value of the access controller Res$_{IMV-AC}$ is unknowable to a trusted platform evaluation layer component, then the IMV in the policy manager in which the evaluation policy is set also returning a component-level evaluation result for the integrity measurement value of the access controller knowable to a trusted platform evaluation layer component Res'$_{IMV-AC}$;

e.5) constructing the integrity measurement value evaluation part of the message 4, which comprises the component-level evaluation result for the integrity measurement value of the access requester $Res_{IMV-AR}$, the component-level remediation information for the integrity measurement value of the access requester $Rems_{IMV-AR}$, the component-level evaluation result for the integrity measurement value of the access requester knowable to a trusted platform evaluation layer component $Res'_{IMV-AR}$, the component-level fault information for the integrity measurement value of the access requester $Faults_{IMV-AR}$, the component-level evaluation result for the integrity measurement value of the access controller $Res_{IMV-AC}$, the component-level remediation information for the integrity measurement value of the access controller $Rems_{IMV-AC}$, the component-level evaluation result for the integrity measurement value of the access controller knowable to a trusted platform evaluation layer component $Res'_{IMV-AC}$, the component-level fault information for the integrity measurement value of the access controller $Faults_{IMV-AC}$, and an integrity measurement value evaluation separate signature $Sig_{PM-IM}$, where the integrity measurement value evaluation separate signature $Sig_{PM-IM}$ is a signature signed by the policy manager by using a private key corresponding to its user certificate on the platform authentication verification challenge from the access controller $N_{AC-PM}$, the integrity measurement parameter for the access requester that is actually measured $Parms_{PC-AR}$, the evaluation policy for the integrity measurement value of the access requester that is actually measured $Evals_{PC-AR}$, the PCR index data of the access requester knowable to a trusted platform evaluation layer component $PCRsIndex'_{IMC-AR}$, the component-level evaluation result for the integrity measurement value of the access requester knowable to a trusted platform evaluation layer component $Res'_{IMV-AR}$, the platform authentication request challenge from the access requester $N_{AR}$, the integrity measurement parameter for the access controller that is actually measured $Parms_{PC-AC}$, the evaluation policy for the integrity measurement value of the access controller that is actually measured $Evals_{PC-AC}$, the PCR index data of the access controller knowable to a trusted platform evaluation layer component $PCRsIndex'_{IMC-AC}$, the component-level evaluation result for the integrity measurement value of the access controller knowable to a trusted platform evaluation layer component $Res'_{IMV-AC}$, the component-level evaluation result for the integrity measurement value of the access requester $Res_{IMV-AR}$, the component-level remediation information for the integrity measurement value of the access requester $Rems_{IMV-AR}$, the component-level fault information for the integrity measurement value of the access requester $Faults_{IMV-AR}$, the component-level evaluation result for the integrity measurement value of the access controller $Res_{IMV-AC}$, the component-level remediation information for the integrity measurement value of the access controller $Rems_{IMV-AC}$, the component-level fault information for the integrity measurement value of the access controller $Faults_{IMV-AC}$, and a parameter Text9; and if the platform identity certificate of the access requester $Cert_{AIK-AR}$ is invalid, then the parameters related to the evaluation of the integrity measurement value of the access requester are set to be NULL or not exist; and if the platform identity certificate of the access controller $Cert_{AIK-AC}$ is invalid, then the parameters related to the evaluation of the integrity measurement value of the access controller are set to be NULL or not exist;

e.6) the evaluation policy server sending the message 4 to the TNC access point, the message 4 comprising the platform identity certificate validity verification part of the message 4, the integrity measurement value evaluation part of the message 4, and a parameter Text4;

e.7) upon receipt of the message 4 sent by the evaluation policy server in the step e.6), the TNC access point performing the following process:

e.7.1) verifying the validity of the certificate validity verification separate signature 1 $Sig1_{PM-AIK}$ and the validity of the integrity measurement value evaluation separate signature $Sig_{PM-IM}$, and if invalid, then discarding the message;

e.7.2) if the platform identity certificate verification result for the access requester $Re_{AIK-AR}$ indicates that the platform identity certificate of the access requester $Cert_{AIK-AR}$ is valid, then verifying whether the integrity measurement parameter for the access requester that is actually measured $Parms_{PC-AR}$ and the integrity measurement parameter for the access requester $Parms_{C-AR}$ are the same, and if not the same, then executing another around of the platform authentication protocol by using a difference between the integrity measurement parameter for the access requester that is actually measured $Parms_{PC-AR}$ and the integrity measurement parameter for the access requester $Parms_{C-AR}$, otherwise, generating, according to the component-level evaluation result for the integrity measurement value of the access requester knowable to a trusted platform evaluation layer component $Res'_{IMV-AR}$ in each round of the platform authentication protocol during the platform authentication, an access decision for the access controller $Action_{AC}$, and sending the access decision for the access controller $Action_{AC}$ to the network access controller; if the platform identity certificate verification result for the access requester $Re_{AIK-AR}$ indicates that the platform identity certificate of the access requester $Cert_{AIK-AR}$ is invalid, then generating the access decision for the access controller $Action_{AC}$ and sending the access decision for the access controller $Action_{AC}$ to the network access controller;

e.7.3) if the access decision for the access controller $Action_{AC}$ is not BLOCK or the access decision for the access controller $Action_{AC}$ has not been generated, and if the component-level evaluation result for the integrity measurement value of the access controller $Res_{IMV-AC}$, the component-level remediation information for the integrity measurement value of the access controller $Rems_{IMV-AC}$, and the component-level fault information for the integrity measurement value of the access controller $Faults_{IMV-AC}$ exist and are not NULL, then sending, according to a message type, them to a corresponding IMC in the access controller; and e.7.4) sending the message 5 to the TNC client, the message 5 comprising the PCR index data of the access controller knowable to a trusted platform evaluation layer component $PCRsIndex'_{IMC-AC}$, the platform identity certificate verification result for the access controller $Re_{AIK-AC}$, the integrity measurement parameter for the access controller that is actually measured $Parms_{PC-AC}$, the evaluation policy for the integrity measurement value of the access controller that is actually measured $Evals_{PC-AC}$, the component-level evaluation result for the integrity measurement value of the access controller knowable to a trusted platform evaluation layer component Res'$_{IMV-AC}$, the component-level evaluation result for the integrity measurement value of the access requester Res$_{IMV-AR}$, the component-level remediation information for the integrity measurement value of the access requester Rems$_{IMV-AR}$, the component-level fault information for the integrity measurement value of the access requester Faults$_{IMV-AR}$, the access decision for the access controller Action$_{AC}$, the platform authentication verification challenge from the access controller N$_{AC-PM}$, the integrity measurement parameter for the access requester that is actually measured Parms$_{PC-AR}$, the evaluation policy for the integrity measurement value of the access requester that is actually measured Evals$_{PC-AR}$, the component-level evaluation result for the integrity measurement value of the access requester knowable to a trusted platform evaluation layer component Res'$_{IMV-AR}$, a certificate validity verification separate signature 2 Sig2$_{PM-AIK}$, an integrity measurement value evaluation separate signature Sig$_{PM-IM}$, and Text5, where if the platform identity certificate of the access requester Cert$_{AIK-AR}$ is invalid, then the parameters related to the evaluation of the integrity measurement value of the access requester are set to be NULL or not exist; and if platform identity certificate of the access controller Cert$_{AIK-AC}$ is invalid, then the parameters related to the evaluation of the integrity measurement value of the access controller are set to be NULL or not exist; and e.8) upon receipt of the message 5 sent by the TNC access point in the step e.7.4), the TNC client performing the following process:

e.8.1) if the access decision for the access controller Action$_{AC}$ is BLOCK, then instructing, the IMC in the access requester that platform remediation is not needed, and generating the access decision for the access requester Action$_{AR}$ and sending the access decision for the access requester Action$_{AR}$ to the network access requester; otherwise, performing step e.8.2);

e.8.2) verifying the validity of the certificate validity verification separate signature 2 Sig2$_{PM-AIK}$ and the validity of the integrity measurement value evaluation separate signature Sig$_{PM-IM}$, and if invalid, then discarding the message; if the platform identity certificate verification result for the access controller Re$_{AIK-AC}$ indicates that the platform identity certificate of the access controller Cert$_{AIK-AC}$ is valid, then verifying whether the integrity measurement parameter for the access controller that is actually measured Parms$_{PC-AC}$ and the integrity measurement parameter for the access controller Parms$_{C-AC}$ are the same, and if not the same, then executing another around of the platform authentication protocol by using the difference between the integrity measurement parameter for the access controller that is actually measured Parms$_{PC-AC}$ and the integrity measurement parameter for the access controller Parms$_{C-AC}$, otherwise, generating, according to the component-level evaluation result for the integrity measurement value of the access controller knowable to a trusted platform evaluation layer component Res'$_{IMV-AC}$ in each round of the platform authentication protocol during the platform authentication, the access decision for the access requester Action$_{AR}$, and sending the access decision for the access requester Action$_{AR}$ to the network access requester; if the platform identity certificate verification result for the access controller Re$_{AIK-AC}$ indicates that the platform identity certificate of the access controller Cert$_{AIK-AC}$ is invalid, then generating the access decision for the access requester Action$_{AR}$ and sending the access decision for the access requester Action$_{AR}$ to the network access requester;

e.8.3) if the access decision for the access requester Action$_{AR}$ is not BLOCK or the access decision for the access requester Action$_{AR}$ has not been generated by the TNC client, and if the component-level evaluation result for the integrity measurement value of the access requester Res$_{IMV-AR}$, the component-level remediation information for the integrity measurement value of the access requester Rems$_{IMV-AR}$, and the component-level fault information for the integrity measurement value of the access requester Faults$_{IMV-AR}$ exist and are not NULL, then sending, according to a message type, them to a corresponding IMC in the access requester; and if the access decision for the access controller Action$_{AC}$ is not NULL, then instructing the IMC in the access requester the access decision for the access controller Action$_{AC}$; and e.8.4) upon generation of the access decision for the access requester Action$_{AR}$, sending the message 6 to the TNC access point, the message 6 comprising the platform authentication activation challenge from the access controller N$_{AC}$, the access decision of the access requester Action$_{AR}$, and a parameter Text6.

9. The platform authentication method applied in a trusted network connect architecture based on tri-element peer authentication according to claim 1, wherein when the verification of the validity of the platform identity certificate and the evaluation of the integrity measurement value both are performed in a separate manner, the signatures in a platform identity certificate validity verification part are signed in a centralized manner, and the signatures in an integrity measurement value evaluation part are signed in a separate manner, the step 4) comprises:

f.1) the evaluation policy server verifying the validity of the platform identity certificate of the access requester Cert$_{AIK-AR}$ and generating a platform identity certificate verification result for the access requester Re$_{AIK-AR}$, and verifying the validity of the platform identity certificate of the access controller Cert$_{AIK-AC}$ and generating a platform identity certificate verification result for the access controller Re$_{AIK-AC}$;

f.2) constructing the platform identity certificate validity verification part of the message 4, which comprises the platform identity certificate verification result for the access requester Re$_{AIK-AR}$, the platform identity certificate verification result for the access controller Re$_{AIK-AC}$, and a certificate validity verification separate signature Sig$_{PM-AIK}$, where the certificate validity verification separate signature Sig$_{PM-AIK}$ is a signature signed by using a private key corresponding to a user certificate on the platform authentication verification challenge from the access controller N$_{AC-PM}$, the platform identity certificate of the access requester Cert$_{AIK-AR}$, the platform identity certificate verification result for the access requester Re$_{AIK-AR}$, the platform authentication request challenge from the access requester N$_{AR}$, the platform identity certificate of the access controller Cert$_{AIK-AC}$, the platform identity certificate verification result for the access controller Re$_{AIK-AC}$, and a Text7;

f.3) if the platform identity certificate of the access requester $Cert_{AIK-AR}$ is valid, then the evaluation policy server firstly setting, according to the integrity measurement parameter for the access requester that is actually measured $Parms_{PC-AR}$ and the evaluation policy for the integrity measurement value of the access requester that is actually measured $Evals_{PC-AR}$, an IMV in a corresponding policy manager, and sending the integrity measurement value of the access requester $IntegrityInfo_{IMC-AR}$ to the IMV in the policy manager in which the evaluation policy is set; then, the IMV in the policy manager in which the evaluation policy is set evaluating the integrity measurement value of the access requester $IntegrityInfo_{IMC-AR}$ and returning a component-level evaluation result for the integrity measurement value of the access requester $Res_{IMV-AR}$, component-level remediation information for the integrity measurement value of the access requester $Rems_{IMV-AR}$, and component-level fault information for the integrity measurement value of the access requester $Faults_{IMV-AR}$; and, if the integrity measurement value of the access requester $IntegrityInfo_{IMC-AR}$ is unknowable to a trusted platform evaluation layer component, then the IMV in the policy manager in which the evaluation policy is set also returning the PCR index data of the access requester knowable to a trusted platform evaluation layer component $PCRsIndex'_{IMC-AR}$; and, if the component-level evaluation result for the integrity measurement value of the access requester $Res_{IMV-AR}$ is unknowable to a trusted platform evaluation layer component, then the IMV in the policy manager in which the evaluation policy is set also returning a component-level evaluation result for the integrity measurement value of the access requester knowable to a trusted platform evaluation layer component $Res'_{IMV-AR}$;

f.4) if the platform identity certificate of the access controller $Cert_{AIK-AC}$ is valid, then the evaluation policy server firstly setting, according to the integrity measurement parameter for the access controller that is actually measured $Parms_{PC-AC}$ and the evaluation policy for the integrity measurement value of the access controller that is actually measured $Evals_{PC-AC}$, an IMV in a corresponding policy manager, and sending the integrity measurement value of the access controller $IntegrityInfo_{IMC-AC}$ to the IMV in the policy manager in which the evaluation policy is set; then, the IMV in the policy manager in which the evaluation policy is set evaluating the integrity measurement value of the access controller $IntegrityInfo_{IMC-AC}$ and returning a component-level evaluation result for the integrity measurement value of the access controller $Res_{IMV-AC}$, component-level remediation information for the integrity measurement value of the access controller $Rems_{IMV-AC}$, and component-level fault information for the integrity measurement value of the access controller $Faults_{IMV-AC}$; and, if the integrity measurement value of the access controller $IntegrityInfo_{IMC-AC}$ is unknowable to a trusted platform evaluation layer component, then the IMV in the policy manager in which the evaluation policy is set also returning PCR index data of the access controller knowable to a trusted platform evaluation layer component $PCRsIndex'_{IMC-AC}$; and, if the component-level evaluation result for the integrity measurement value of the access controller $Res_{IMV-AC}$ is unknowable to a trusted platform evaluation layer component, then the IMV in the policy manager in which the evaluation policy is set also returning a component-level evaluation result for the integrity measurement value of the access controller knowable to a trusted platform evaluation layer component $Res'_{IMV-AC}$;

f.5) constructing the integrity measurement value evaluation part of the message 4, which comprises the component-level evaluation result for the integrity measurement value of the access requester $Res_{IMV-AR}$, the component-level remediation information for the integrity measurement value of the access requester $Rems_{IMV-AR}$, the component-level evaluation result for the integrity measurement value of the access requester knowable to a trusted platform evaluation layer component $Res'_{IMV-AR}$, the component-level fault information for the integrity measurement value of the access requester $Faults_{IMV-AR}$, the component-level evaluation result for the integrity measurement value of the access controller $Res_{IMV-AC}$, the component-level remediation information for the integrity measurement value of the access controller $Rems_{IMV-AC}$, the component-level evaluation result for the integrity measurement value of the access controller knowable to a trusted platform evaluation layer component $Res'_{IMV-AC}$, the component-level fault information for the integrity measurement value of the access controller $Faults_{IMV-AC}$, an integrity measurement value evaluation separate signature 1 $Sig1_{PM-IM}$, and an integrity measurement value evaluation separate signature 2 $Sig2_{PM-IM}$, where the integrity measurement value evaluation separate signature 1 $Sig1_{PM-IM}$ is a signature signed by the policy manager by using a private key corresponding to its user certificate on the platform authentication verification challenge from the access controller $N_{AC-PM}$, the integrity measurement parameter for the access requester that is actually measured $Parms_{PC-AR}$, the evaluation policy for the integrity measurement value of the access requester that is actually measured $Evals_{PC-AR}$, the PCR index data of the access requester knowable to a trusted platform evaluation layer component $PCRsIndex'_{IMC-AR}$, the component-level evaluation result for the integrity measurement value of the access requester knowable to a trusted platform evaluation layer component $Res'_{IMV-AR}$, the component-level evaluation result for the integrity measurement value of the access controller $Res_{IMV-AC}$, the component-level remediation information for the integrity measurement value of the access controller $Rems_{IMV-AC}$, the component-level fault information for the integrity measurement value of the access controller $Faults_{IMV-AC}$, and a parameter Text9, and the integrity measurement value evaluation separate signature 2 $Sig2_{PM-IM}$ is a signature signed by the policy manager by using a private key corresponding to its user certificate on the platform authentication request challenge from the access requester $N_{AR}$, the integrity measurement parameter for the access controller that is actually measured $Parms_{PC-AC}$, the evaluation policy for the integrity measurement value of the access controller that is actually measured $Evals_{PC-AC}$, the PCR index data of the access controller knowable to a trusted platform evaluation layer component $PCRsIndex'_{IMC-AC}$, the component-level evaluation result for the integrity measurement value of the access controller knowable to a trusted platform evaluation layer component $Res'_{IMV-AC}$, the component-level evaluation result for the integrity measurement value of the access requester $Res_{IMV-AR}$, the component-level remediation information for the integrity measurement value of the access requester $Rems_{IMV-AR}$, the component-level fault information for the integrity measurement value of the access requester Faults$_{IMV-AR}$, and a parameter Text10; and if the platform identity certificate of the access requester Cert$_{AIK-AR}$ is invalid, then the parameters related to the evaluation of the integrity measurement value of the access requester are set to be NULL or not exist; and if the platform identity certificate of the access controller Cert$_{AIK-AC}$ is invalid, then the parameters related to the evaluation of the integrity measurement value of the access controller are set to be NULL or not exist;

f.6) the evaluation policy server sending the message 4 to the TNC access point, the message 4 comprising the platform identity certificate validity verification part of the message 4, the integrity measurement value evaluation part of the message 4, and a parameter Text4;

f.7) upon receipt of the message 4 sent by the evaluation policy server in the step f.6), the TNC access point performing the following process:

f.7.1) verifying the validity of the certificate validity verification separate signature Sig$_{PM-AIK}$ and the validity of the integrity measurement value evaluation separate signature 1 Sig1$_{PM-IM}$, and if invalid, then discarding the message;

f.7.2) if the platform identity certificate verification result for the access requester Re$_{AIK-AR}$ indicates that the platform identity certificate of the access requester Cert$_{AIK-AR}$ is valid, then verifying whether the integrity measurement parameter for the access requester that is actually measured Parms$_{PC-AR}$ and the integrity measurement parameter for the access requester Parms$_{C-AR}$ are the same, and if not the same, then executing another around of the platform authentication protocol by using a difference between the integrity measurement parameter for the access requester that is actually measured Parms$_{PC-AR}$ and the integrity measurement parameter for the access requester Parms$_{C-AR}$, otherwise, generating an access decision for the access controller Action$_{AC}$, according to the component-level evaluation result for the integrity measurement value of the access requester knowable to a trusted platform evaluation layer component Res'$_{IMV-AR}$ in each round of the platform authentication protocol during the platform authentication, and sending the access decision for the access controller Action$_{AC}$ to the network access controller; if the platform identity certificate verification result for the access requester Re$_{AIK-AR}$ indicates that the platform identity certificate of the access requester Cert$_{AIK-AR}$ is invalid, then generating the access decision for the access controller Action$_{AC}$ and sending the access decision for the access controller Action$_{AC}$ to the network access controller;

f.7.3) if the access decision for the access controller Action$_{AC}$ is not BLOCK or the access decision for the access controller Action$_{AC}$ has not been generated, and if the component-level evaluation result for the integrity measurement value of the access controller Res$_{IMV-AC}$, the component-level remediation information for the integrity measurement value of the access controller Rems$_{IMV-AC}$, and the component-level fault information for the integrity measurement value of the access controller Faults$_{IMV-AC}$ exist and are not NULL, then sending, according to a message type, them to a corresponding IMC in the access controller; and f.7.4) sending the message 5 to the TNC client, the message 5 comprising the PCR index data of the access controller knowable to a trusted platform evaluation layer component PCRsIndex'$_{IMC-AC}$, the platform identity certificate verification result for the access controller Re$_{AIK-AC}$, the integrity measurement parameter for the access controller that is actually measured Parms$_{PC-AC}$, the evaluation policy for the integrity measurement value of the access controller that is actually measured Evals$_{PC-AC}$, the component-level evaluation result for the integrity measurement value of the access controller knowable to a trusted platform evaluation layer component Res'$_{IMV-AC}$, the component-level evaluation result for the integrity measurement value of the access requester Res$_{IMV-AR}$, the component-level remediation information for the integrity measurement value of the access requester Rems$_{IMV-AR}$, the component-level fault information for the integrity measurement value of the access requester Faults$_{IMV-AR}$, the access decision for the access controller Action$_{AC}$, the platform authentication verification challenge from the access controller N$_{AC-PM}$, the platform identity certificate verification result for the access requester Re$_{AIK-AR}$, the certificate validity verification separate signature Sig$_{PM-AIK}$, an integrity measurement value evaluation separate signature 2 Sig2$_{PM-IM}$, and Text5, where if the platform identity certificate of the access requester Cert$_{AIK-AR}$ is invalid, then the parameters related to the evaluation of the integrity measurement value of the access requester are set to be NULL or not exist; and if platform identity certificate of the access controller Cert$_{AIK-AC}$ is invalid, then the parameters related to the evaluation of the integrity measurement value of the access controller are set to be NULL or not exist; and f.8) upon receipt of the message 5 sent by the TNC access point in the step f.7.4), the TNC client performing the following process:

f.8.1) if the access decision for the access controller Action$_{AC}$ is BLOCK, then instructing, the IMC in the access requester that platform remediation is not needed, and generating the access decision for the access requester Action$_{AR}$ and sending the access decision for the access requester Action$_{AR}$ to the network access requester; otherwise, performing step f.8.2);

f.8.2) verifying the validity of the certificate validity verification separate signature Sig$_{PM-AIK}$ and the validity of the integrity measurement value evaluation separate signature Sig$_{PM-IM}$, and if invalid, discarding the message; if the platform identity certificate verification result for the access controller Re$_{AIK-AC}$ indicates that the platform identity certificate of the access controller Cert$_{AIK-AC}$ is valid, then verifying whether the integrity measurement parameter for the access controller that is actually measured Parms$_{PC-AC}$ and the integrity measurement parameter for the access controller Parms$_{C-AC}$ are the same, and if not the same, then executing another around of the platform authentication protocol by using the difference between the integrity measurement parameter for the access controller that is actually measured Parms$_{PC-AC}$ and the integrity measurement parameter for the access controller Parms$_{C-AC}$, otherwise, generating, according to the component-level evaluation result for the integrity measurement value of the access controller knowable to a trusted platform evaluation layer component Res'$_{IMV-AC}$ in each round of the platform authentication protocol during the platform authentication, the access decision for the access requester $Action_{AR}$, and sending the access decision for the access requester $Action_{AR}$ to the network access requester; if the platform identity certificate verification result for the access controller $Re_{AIK-AC}$ indicates that the platform identity certificate of the access controller $Cert_{AIK-AC}$ is invalid, then generating the access decision for the access requester $Action_{AR}$ and sending the access decision for the access requester $Action_{AR}$ to the network access requester;

f.8.3) if the access decision for the access requester $Action_{AR}$ is not BLOCK or the access decision for the access requester $Action_{AR}$ has not been generated by the TNC client, and if the component-level evaluation result for the integrity measurement value of the access requester $Res_{IMV-AR}$, the component-level remediation information for the integrity measurement value of the access requester $Rems_{IMV-AR}$, and the component-level fault information for the integrity measurement value of the access requester $Faults_{IMV-AR}$ exist and are not NULL, then sending, according to a message type, them to a corresponding IMC in the access requester; and if the access decision for the access controller $Action_{AC}$ is not NULL, then instructing the IMC in the access requester the access decision for the access controller $Action_{AC}$; and f.8.4) upon generation of the access decision for the access requester ActionAR, sending the message 6 to the TNC access point, the message 6 comprising the platform authentication activation challenge from the access controller NAC, the access decision of the access requester ActionAR, and a parameter Text6.

* * * * *